(12) United States Patent
Kono et al.

(10) Patent No.: US 11,513,639 B2
(45) Date of Patent: Nov. 29, 2022

(54) INPUT DETECTION SYSTEM

(71) Applicant: Japan Display Inc., Tokyo (JP)

(72) Inventors: Takaaki Kono, Tokyo (JP); Yuto Kakinoki, Tokyo (JP); Makoto Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/574,903

(22) Filed: Jan. 13, 2022

(65) Prior Publication Data

US 2022/0229503 A1 Jul. 21, 2022

(30) Foreign Application Priority Data

Jan. 18, 2021 (JP) .............................. JP2021-005964

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ................................ G06F 3/044; G06F 3/0412
See application file for complete search history.

(56) References Cited

U.S. PATENT DOCUMENTS

| | | | |
|---|---|---|---|
| 2016/0209957 A1* | 7/2016 | Jung | G06F 3/017 |
| 2018/0018028 A1* | 1/2018 | Lee | G06F 3/0383 |
| 2020/0064951 A1* | 2/2020 | Bauer | G06F 3/044 |
| 2020/0225804 A1* | 7/2020 | Ikegami | G06F 3/0418 |
| 2020/0233521 A1* | 7/2020 | Sasaki | G06F 3/0393 |
| 2020/0301547 A1 | 9/2020 | Mori et al. | |
| 2021/0232260 A1* | 7/2021 | Fong | G06F 3/0446 |
| 2021/0232269 A1 | 7/2021 | Sasaki et al. | |
| 2022/0091697 A1* | 3/2022 | Miyagawa | G06F 3/0416 |

FOREIGN PATENT DOCUMENTS

| | | |
|---|---|---|
| JP | 6342105 B1 | 6/2018 |
| JP | 6532631 B1 | 6/2019 |
| WO | WO2019/116490 A1 | 6/2019 |
| WO | WO2020/079729 A1 | 4/2020 |

* cited by examiner

*Primary Examiner* — Hong Zhou
(74) *Attorney, Agent, or Firm* — K&L Gates LLP

(57) ABSTRACT

An input detection system includes a plurality of drive electrodes and a plurality of detection electrodes aligned in a detection region, an input device including an LC circuit, a first electrode coupled to one end side of the LC circuit, and a second electrode coupled to another end side of the LC circuit, the input support device being disposed on the detection region, and a control circuit configured to detect the input support device based on detection signals that are output from the detection electrodes.

17 Claims, 25 Drawing Sheets

INPUT DETECTION SYSTEM

CROSS-REFERENCE TO RELATED APPLICATION

This application claims the benefit of priority from Japanese Patent Application No. 2021-005964 filed on Jan. 18, 2021, the entire contents of which are incorporated herein by reference.

BACKGROUND

1. Technical Field

The present disclosure relates to an input detection system.

2. Description of the Related Art

Japanese Patent Nos. 6342105 and 6532631 describe an input support device (referred to as an operation knob or a knob in Japanese Patent Nos. 6342105 and 6532631) that is placed on a touch panel configured to detect change in electrostatic capacitance or change in a contact region and supports input operations through the touch panel. As a method for detecting the input support device, a method with which the input support device is detected using resonance of a resonance circuit provided in the input support device has been known. An input detection system using the above-mentioned input support device can detect operation states of the input support device based on pieces of information such as a rotation angle and a shape of the input support device in addition to position information of the input support device.

The input detection system is required to detect various pieces of information of the input support device with high accuracy.

SUMMARY

An input detection system includes a plurality of drive electrodes and a plurality of detection electrodes aligned in a detection region, an input device including an LC circuit, a first electrode coupled to one end side of the LC circuit, and a second electrode coupled to another end side of the LC circuit, the input support device being disposed on the detection region, and a control circuit configured to detect the input support device based on detection signals that are output from the detection electrodes. Each of the first electrode and the second electrode of the input device faces some of the drive electrodes and detection electrodes, a reference potential is supplied to the drive electrode corresponding to one of the first electrode and the second electrode, a drive signal is supplied to the drive electrode corresponding to the other of the first electrode and the second electrode, each of the first electrode and the second electrode forms capacitance with the facing detection electrode based on the reference potential or the drive signal, and the detection electrodes form capacitances with the first electrode and the second electrode of the input support device and the adjacent drive electrode and output the detection signals that are generated based on the capacitances to the control circuit, and the control circuit forms two-dimensional distribution of a plurality of signal values corresponding to the detection region based on the detection signals that are output from the detection electrodes and detects, from the two-dimensional distribution, a plurality of positive-polarity regions formed by a plurality of positive-polarity signal values of equal to or larger than a predetermined first threshold and a plurality of negative-polarity regions formed by a plurality of negative-polarity signal values of equal to or smaller than a predetermined second threshold.

DETAILED DESCRIPTION

Figure 1:
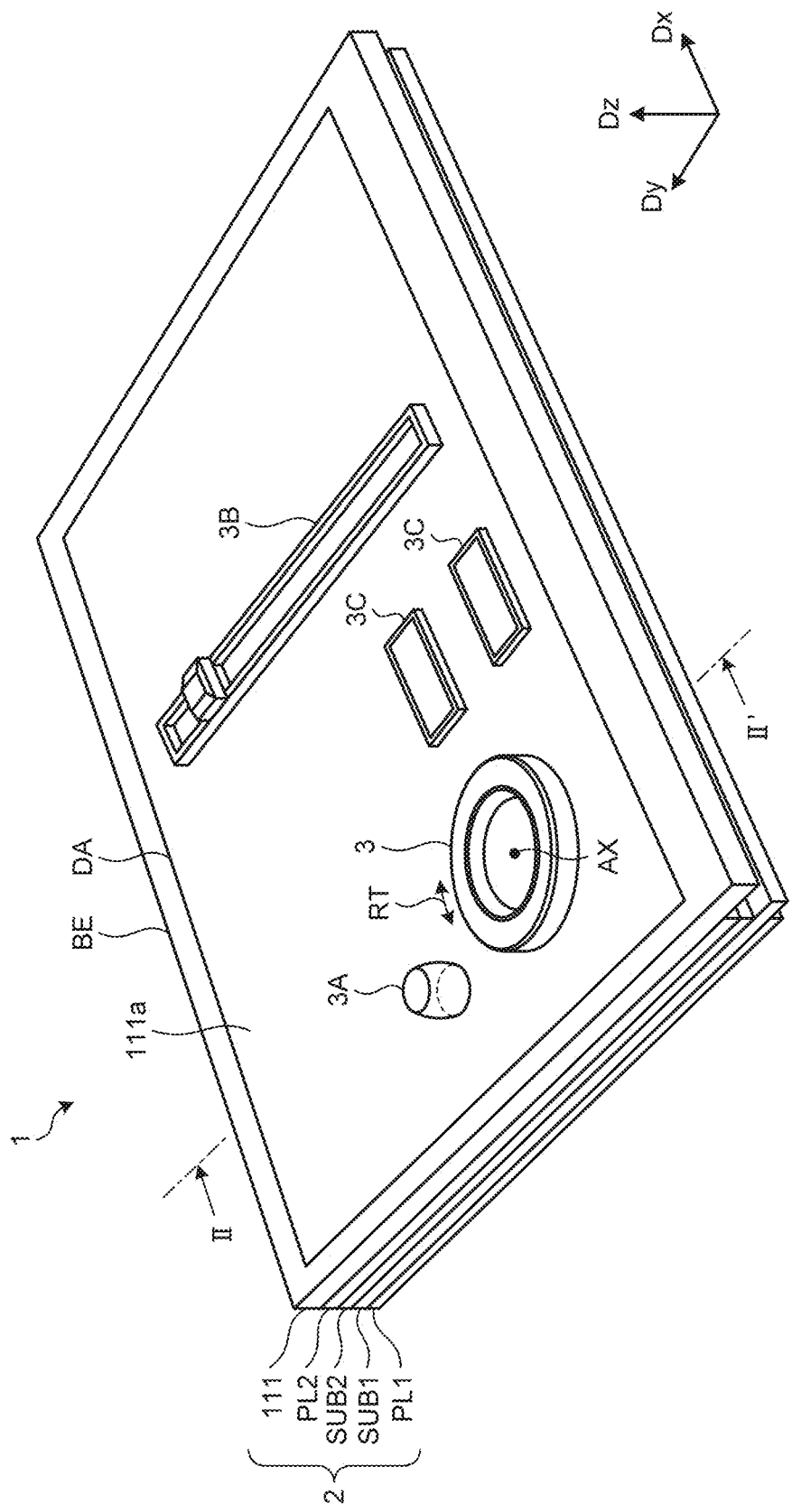
FIG. 1 is a perspective view schematically illustrating an input detection system according to a first embodiment.

Aspects for carrying out the present disclosure (embodiments) will be described in detail with reference to the drawings. Contents described in the following embodiments do not limit the present disclosure. Components described below include those that can be easily assumed by those skilled in the art and substantially the same components. Furthermore, the components described below can be appropriately combined. What is disclosed herein is merely an example, and appropriate modifications within the gist of the disclosure of which those skilled in the art can easily think are naturally encompassed in the scope of the present disclosure. In the drawings, widths, thicknesses, shapes, and the like of the components can be schematically illustrated in comparison with actual aspects for more clear explanation. They are however merely examples and do not limit interpretation of the present disclosure. In the present disclosure and the drawings, the same reference numerals denote components similar to those described before with reference to the drawing that has been already referred, and detail explanation thereof can be appropriately omitted.

In the present specification and the scope of the invention, when an aspect in which another structure is arranged above a certain structure is represented, simple expression "above" includes both of the case in which another structure is arranged just above the certain structure and the case in which another structure is arranged above the certain structure with still another structure interposed therebetween unless otherwise specified.

First Embodiment

Figure 2:
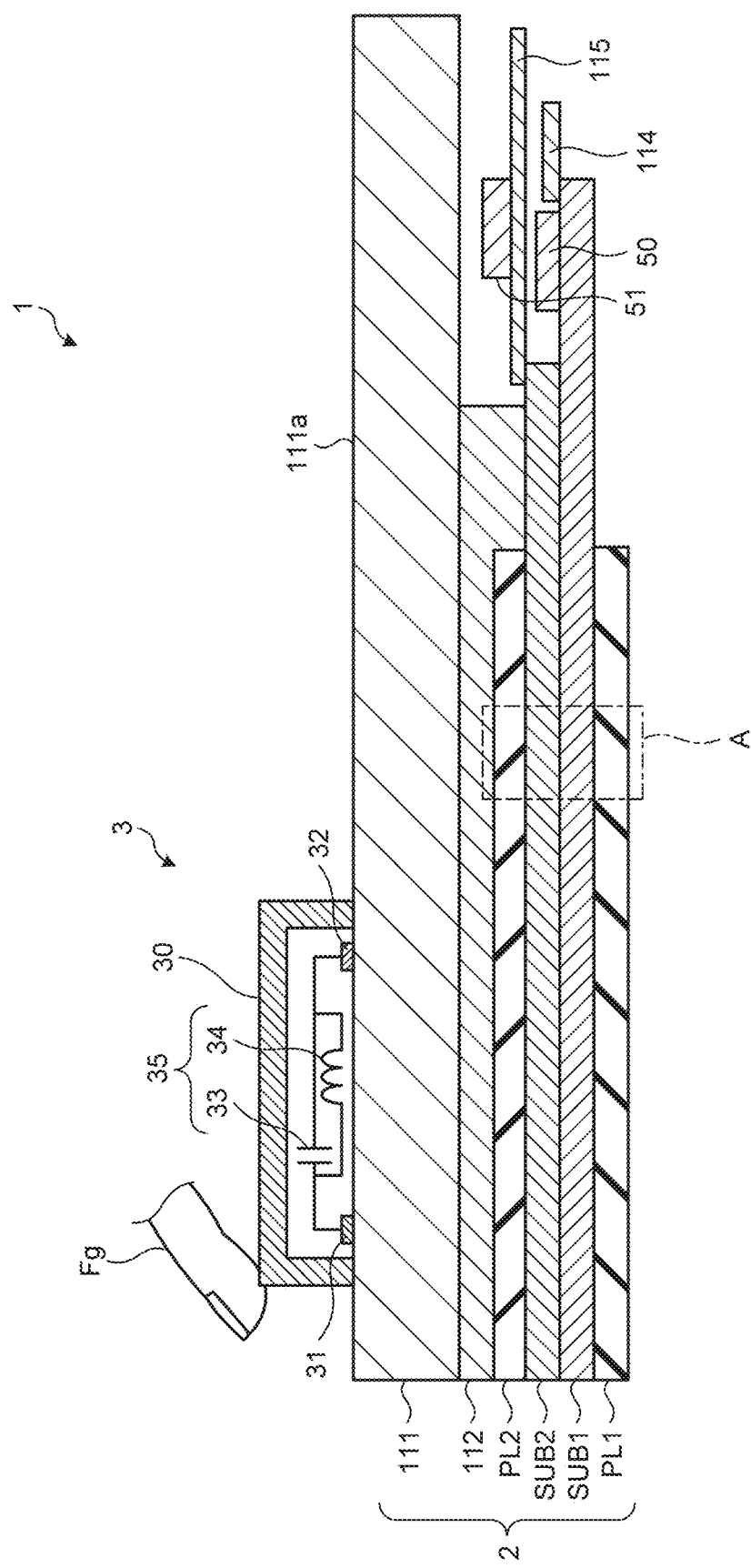
FIG. 2 is a cross-sectional view cut along line II-II' in FIG. 1.

FIG. 1 is a perspective view schematically illustrating an input detection system according to a first embodiment. FIG. 2 is a cross-sectional view cut along line II-II' in FIG. 1. As illustrated in FIG. 1 and FIG. 2, an input detection system 1 includes a display device 2 and an input support device (input device) 3.

One direction of a plane (upper surface 111a) of the display device 2 is a first direction Dx, and a direction orthogonal to the first direction Dx is a second direction Dy. The second direction Dy is not limited to be orthogonal to the first direction Dx and may intersect with the first direction Dx at an angle other than 90°. A third direction Dz orthogonal to the first direction Dx and the second direction Dy corresponds to the thickness direction of an array substrate SUB1.

As illustrated in FIG. 1, the display device 2 includes the array substrate SUB1, a counter substrate SUB2, a first polarizing plate PL1, a second polarizing plate PL2, a cover member 111, and an adhesive layer 112 (refer to FIG. 2). The first polarizing plate PL1, the array substrate SUB1, the counter substrate SUB2, the second polarizing plate PL2, the adhesive layer 112, and the cover member 111 are stacked in this order in the third direction Dz.

The array substrate SUB1 is a drive circuit substrate for driving a plurality of pixels PX. The array substrate SUB1 includes a first substrate 10 as a base body. The array substrate SUB1 includes switching elements Tr and various wiring lines such as scan lines GL and pixel signal lines SL (refer to FIG. 4) provided on the first substrate 10. The counter substrate SUB2 is provided so as to face the array substrate SUB1 and includes a second substrate 20 as a base body. The counter substrate SUB2 includes color filters CF and a light shielding layer BM (refer to FIG. 3) provided on the second substrate 20. The first substrate 10 and the second substrate 20 are made of a material having a light transmitting property, such as a glass substrate and a resin substrate.

The length of the array substrate SUB1 in the second direction Dy is larger than the length of the counter substrate SUB2 in the second direction Dy. As illustrated in FIG. 1, the array substrate SUB1 (first substrate 10) has a portion (protruding portion) projecting to the outer side rather than the counter substrate SUB2 (second substrate 20). The lengths of the array substrate SUB1 and the counter substrate SUB2 in the second direction Dy are smaller than the lengths thereof in the first direction Dx. The lengths are however not limited to be set in this manner, and the lengths of the array substrate SUB1 and the counter substrate SUB2 in the second direction Dy may be larger than the lengths thereof in the first direction Dx.

As illustrated in FIG. 1, a peripheral region BE is provided on the outer side of a display region DA in the display device 2. The display region DA is formed to have a square shape but the outer shape of the display region DA is not limited thereto. For example, the display region DA may have a substantially square shape with curved corners or may have a cutout. Alternatively, the display region DA may have another polygonal shape or another shape such as a circular shape and an elliptic shape.

The display region DA is a region for displaying an image and is a region in which the pixels PX are provided. The peripheral region BE indicates a region on the inner side of the outer circumference of the array substrate SUB1 and on the outer side of the display region DA. The peripheral region BE may have a frame shape surrounding the display region DA, and in this case, the peripheral region BE can also be referred to as a frame region.

As illustrated in FIG. 2, a display integrated circuit (IC) 50 and a wiring substrate 114 are coupled to the protruding portion of the array substrate SUB1. The display IC 50 includes a control circuit that controls display of the display device 2 and touch detection. The display IC 50 is not limited to this example and may be mounted on the wiring substrate 114. Arrangement of the display IC 50 is not limited thereto, and the display IC 50 may be provided on a control substrate or a flexible substrate outside the module, for example.

A wiring substrate 115 is coupled to the counter substrate SUB2. A detection IC 51 is mounted on the wiring substrate 115. The detection IC 51 includes a detection circuit 55 (refer to FIG. 7) and receives supply of detection signals Vdet from detection electrodes Rx. The detection IC 51 can detect a detection target such as a finger Fg and the input support device 3 based on the detection signals Vdet. Arrangement of the detection IC 51 is not limited thereto, and the detection IC 51 may be provided on a control substrate or a flexible substrate outside the module, for example.

Each of the wiring substrate 114 and the wiring substrate 115 is configured by, for example, flexible printed circuits (FPC). The wiring substrate 114 is coupled to a plurality of terminals of the first substrate 10. The wiring substrate 115 is coupled to a plurality of terminals of the second substrate 20.

As illustrated in FIG. 1 and FIG. 2, the input support device 3 is arranged (mounted) on the upper surface 111a of the cover member 111 for use. A user can perform an input operation on the display device 2 by operating the input support device 3 arranged above the display device 2. The input support device 3 is, for example, a rotary knob and has a circular shape in a plan view when seen from the upper surface 111a of the display device 2. The display device 2 can detect a position of the input support device 3 in a plane and a rotation operation RT centered on a rotating axis AX. That is to say, in the present embodiment, the display region DA is a region in which a plurality of drive electrodes Tx and the detection electrodes Rx (refer to FIG. 5) are provided and serves also as a detection region.

As illustrated in FIG. 2, the input support device 3 includes a housing 30, a first electrode 31, a second electrode 32, and an LC circuit 35. The housing 30 is formed by, for example, a conductor made of a metal material and is a hollow member having a space therein. The housing 30 is not limited to be made of the metal material and may be made of a resin material. Alternatively, the housing 30 may be formed by providing the resin material so as to cover the surface of the metal material. The first electrode 31, the second electrode 32, and the LC circuit 35 are provided in the housing 30. The LC circuit 35 configures an LC resonance circuit in which a capacitor 33 and an inductor 34 are coupled in parallel with each other. The first electrode 31 is coupled to one end side of the LC circuit 35 (coupling portion N1 (refer to FIG. 7) of the capacitor 33 and the inductor 34 on one end side). The second electrode 32 is coupled to the other end side of the LC circuit 35 (coupling portion N2 (refer to FIG. 7) of the capacitor 33 and the inductor 34 on the other end side). The display device 2 can detect positions of the first electrode 31 and the second electrode 32 using LC resonance of the LC circuit 35.

FIG. 1 illustrates a plurality of input support devices 3A, 3B, and 3C as other examples of the input support device 3. The input support device 3A is a rotary knob and is formed into a tab shape having a planar shape (radius) smaller than that of the input support device 3. The input support device 3B is a slider, and an input operation can be performed by displacement of a tab thereof in a plane. The input support device 3B has a bar-like shape in a plan view. The input support device 3C is a button or an input key, and an input operation can be performed by touching the input support device 3C or performing a press-in operation thereon. The input detection system 1 is not limited to have the configuration in which all of the input support devices 3, 3A, 3B, and 3C are mounted, and it is sufficient that at least equal to or more than one of the input support devices 3, 3A, 3B, and 3C is provided. Hereinafter, the input support device 3 is described. Explanation of the input support device 3 can be applied also to the other input support devices 3A, 3B, and 3C.

Figure 3:
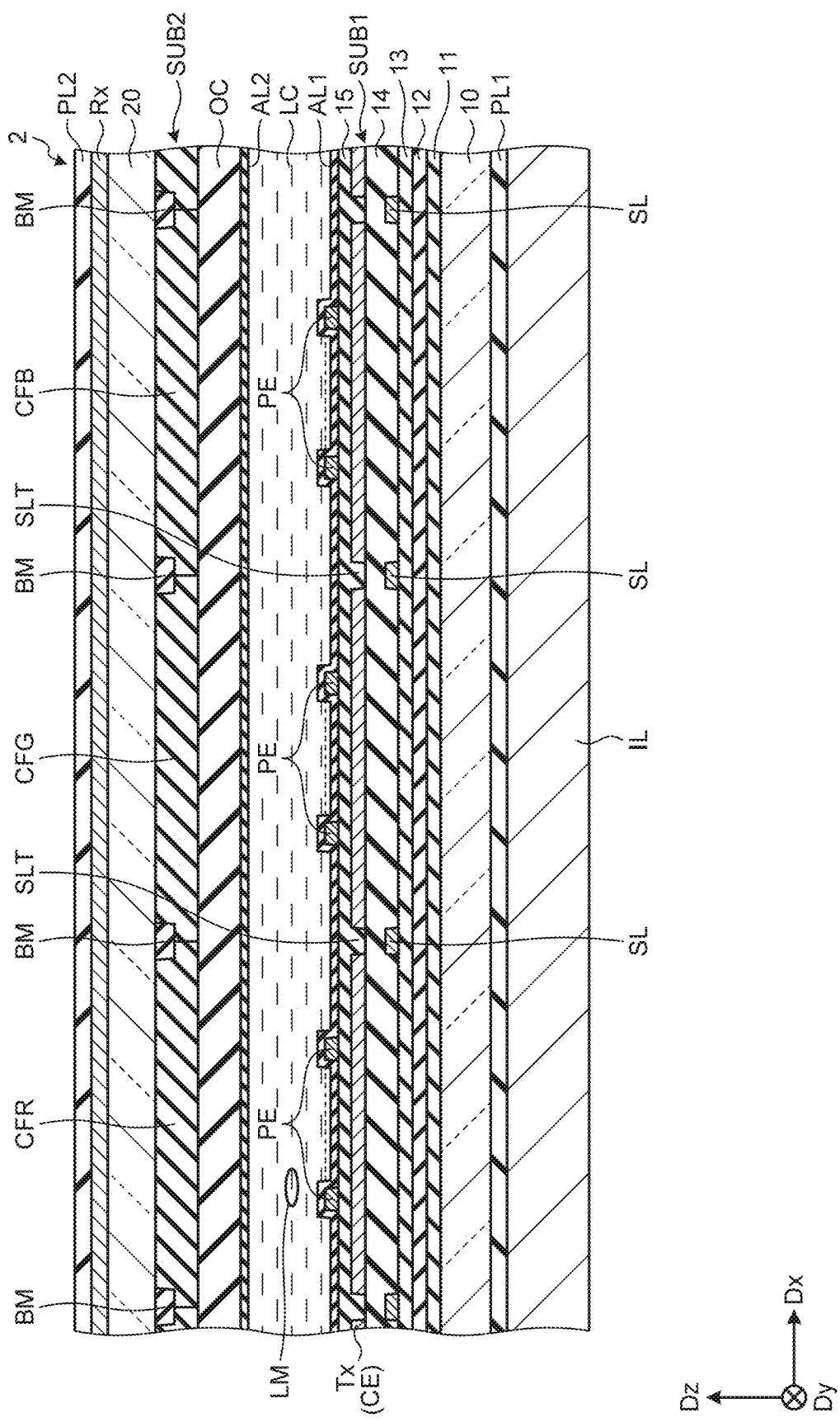
FIG. 3 is a cross-sectional view illustrating the schematic cross-sectional configuration of a display device.

FIG. 3 is a cross-sectional view illustrating the schematic cross-sectional configuration of the display device. FIG. 3 is a cross-sectional view of a part surrounded by a region A in FIG. 2, for example. As illustrated in FIG. 3, the display device 2 further includes an illumination device IL. The counter substrate SUB2 is arranged so as to face the surface of the array substrate SUB1 in the vertical direction. A liquid crystal layer LC is provided between the array substrate SUB1 and the counter substrate SUB2. The liquid crystal layer LC as a display function layer is arranged between the first substrate 10 and the second substrate 20. The illumination device IL, the first polarizing plate PL1, the array substrate SUB1, the counter substrate SUB2, and the second polarizing plate PL2 are stacked in this order in the third direction Dz.

The array substrate SUB1 faces the illumination device IL, and the counter substrate SUB2 is located on the display surface side. The illumination device IL emits light toward the array substrate SUB1. For example, a side light-type backlight or a direct-type backlight can be applied to the illumination device IL. Although various aspects can be applied to the illumination device IL, explanation of the detail configurations thereof is omitted.

An optical element including the first polarizing plate PL1 faces the first substrate 10. To be more specific, the first polarizing plate PL1 is arranged on the outer surface of the first substrate 10 or on the surface thereof facing the illumination device IL. An optical element including the second polarizing plate PL2 faces the second substrate 20. To be more specific, the second polarizing plate PL2 is arranged on the outer surface of the second substrate 20 or on the surface thereof on an observation position side. A first polarization axis of the first polarizing plate PL1 and a second polarization axis of the second polarizing plate PL2 have a crossed Nicol positional relation in an X-Y plane, for example. The optical elements including the first polarizing plate PL1 and the second polarizing plate PL2 may include another optical function element such as a phase difference plate.

The array substrate SUB1 includes insulating films 11, 12, 13, 14, and 15, the pixel signal lines SL, pixel electrodes PE, the drive electrodes Tx (common electrodes CE), a first orientation film AL1, and the like on the side of the first substrate 10 that faces the counter substrate SUB2.

In the present specification, the direction toward the second substrate 20 from the first substrate 10 in the direction perpendicular to the first substrate 10 is an "upper-side" or simply an "above". The direction toward the first substrate 10 from the second substrate 20 is a "lower-side" or simply a "downward". The expression "plan view" indicates a positional relation when seen from the direction perpendicular to the first substrate 10.

The insulating film 11 is provided above the first substrate 10. The insulating films 11, 12, and 13, and the insulating film 15 are, for example, inorganic insulating films made of an inorganic material having a light transmitting property, such as silicon oxide and silicon nitride.

The insulating film 12 is provided above the insulating film 11. The insulating film 13 is provided above the insulating film 12. The pixel signal lines SL are provided above the insulating film 13. The insulating film 14 is provided above the insulating film 13 and covers the pixel signal lines SL. The insulating film 14 is made of a resin material having a light transmitting property and has a film thickness that is larger than that of the other insulating films made of the inorganic material. Although not illustrated in FIG. 3, the scan lines GL are provided above the insulating film 12, for example.

The drive electrodes Tx are provided above the insulating film 14. The drive electrodes Tx are provided in the display region DA and are divided into a plurality of parts by slits SLT. Alternatively, a plurality of in-electrode slits (not illustrated) may be provided in the drive electrodes Tx. The drive electrodes Tx are covered by the insulating film 15. The drive electrodes Tx serve as the drive electrodes Tx for touch detection and the common electrodes CE in display.

The pixel electrodes PE are provided above the insulating film 15 and face the drive electrodes Tx with the insulating film 15 interposed therebetween. The pixel electrodes PE and the drive electrodes Tx are made of, for example, a conductive material having a light transmitting property, such as indium tin oxide (ITO) and indium zinc oxide (IZO). The first orientation film AL1 covers the pixel electrodes PE and the insulating film 15.

The counter substrate SUB2 includes the light shielding layer BM, color filters CFR, CFG, and CFB, an overcoat layer OC, a second orientation film AL2, and the like on the side of the second substrate 20 that faces the array substrate SUB1. The counter substrate SUB2 includes the detection electrodes Rx and the second polarizing plate PL2 on the side of the second substrate 20 that is opposite to the array substrate SUB1.

The light shielding layer BM is located on the side of the second substrate 20 that face the array substrate SUB1 in the display region DA. The light shielding layer BM defines openings that respectively face the pixel electrodes PE. The pixel electrodes PE are partitioned for the respective openings of the pixels PX. The light shielding layer BM is made of a resin material in black color or a metal material having a light shielding property.

The color filters CFR, CFG, and CFB are located on the side of the second substrate 20 that faces the array substrate SUB1, and end portions thereof overlap with the light shielding layer BM. As an example, the color filters CFR, CFG, and CFB are made of a resin material colored with red, green, and blue, respectively.

The overcoat layer OC covers the color filters CFR, CFG, and CFB. The overcoat layer OC is made of a resin material having a light transmitting property. The second orientation film AL2 covers the overcoat layer OC. The first orientation film AL1 and the second orientation film AL2 are made of, for example, a material exhibiting horizontal orientation performance.

The detection electrodes Rx are provided above the second substrate 20. The detection electrodes Rx are metal wiring made of a conductive material, for example. Alternatively, the detection electrodes Rx may be made of a conductive material having a light transmitting property, such as ITO.

The array substrate SUB1 and the counter substrate SUB2 are arranged such that the first orientation film AL1 and the second orientation film AL2 face each other. The liquid crystal layer LC is enclosed into between the first orientation film AL1 and the second orientation film AL2. The liquid crystal layer LC is made of a negative liquid crystal material having a negative dielectric anisotropy or a positive liquid crystal material having a positive dielectric anisotropy.

For example, when the liquid crystal layer LC is made of the negative liquid crystal material and a state in which no voltage is applied to the liquid crystal layer LC is established, liquid crystal molecules LM are initially oriented in such a direction that long axes thereof are along the first direction Dx in the X-Y plane. On the other hand, in a state in which a voltage is applied to the liquid crystal layer LC, that is, in an ON state in which an electric field is formed between the pixel electrodes PE and the drive electrodes Tx, the liquid crystal molecules LM receive influences of the electric field and orientation states thereof are changed. In the ON state, a polarization state of incident linearly polarized light is changed in accordance with the orientation states of the liquid crystal molecules LM when it passes through the liquid crystal layer LC.

Figure 4:
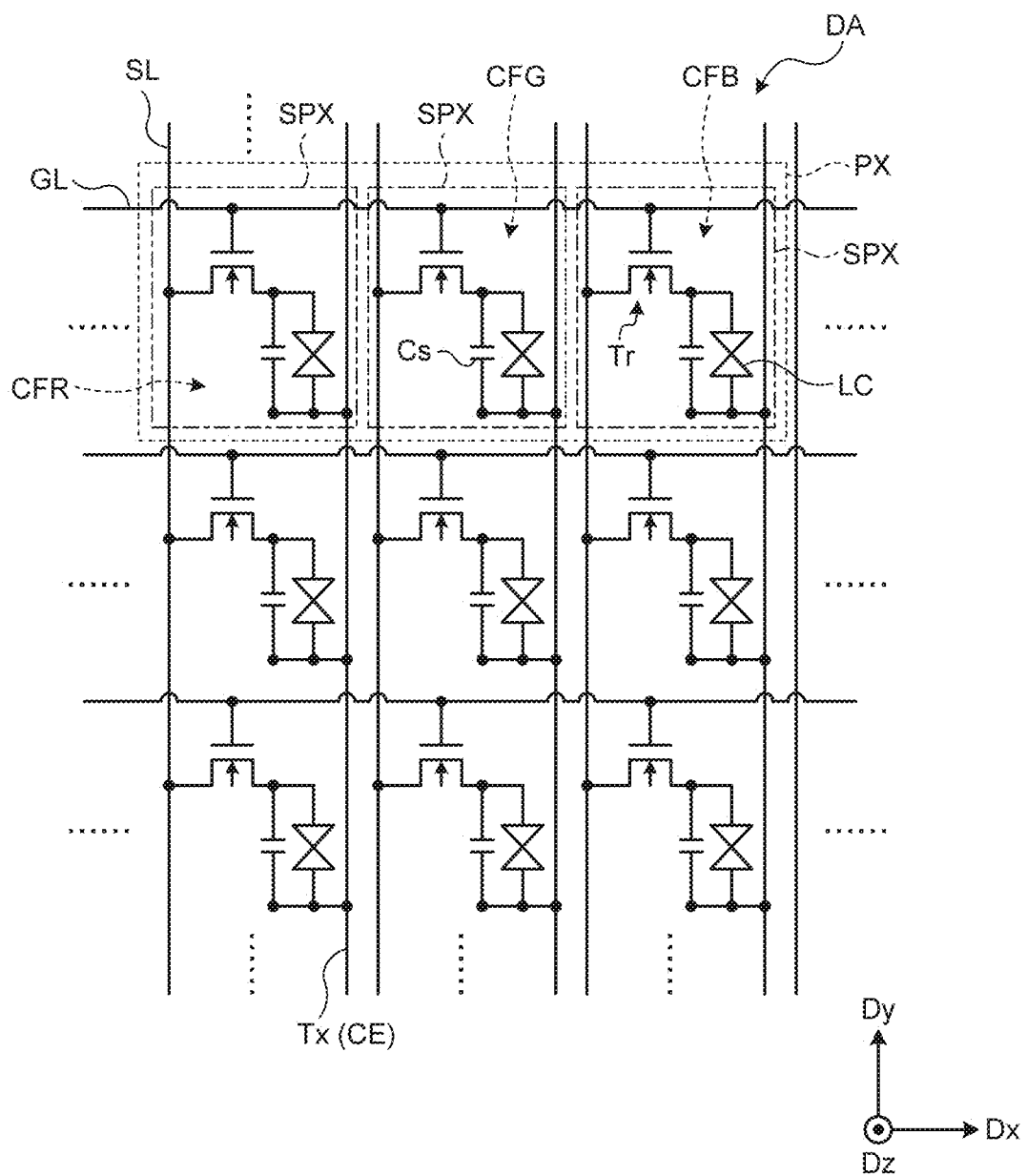
FIG. 4 is a circuit diagram illustrating pixel array of a display region.

FIG. 4 is a circuit diagram illustrating pixel array of the display region. The switching elements Tr of respective sub pixels SPX, the pixel signal lines SL, and the scan lines GL illustrated in FIG. 4, and the like are formed on the array substrate SUB1. The pixel signal lines SL extend in the second direction Dy. The pixel signal lines SL are wiring lines configured to supply pixel signals to the pixel electrodes PE (refer to FIG. 3). The scan lines GL extend in the first direction Dx. The scan lines GL are wiring lines configured to supply a drive signal (scan signal) for driving the switching elements Tr.

Each pixel PX includes the sub pixels SPX. Each sub pixel SPX includes the switching element Tr and capacitance of the liquid crystal layer LC. The switching element Tr is formed by a thin film transistor and, in this example, is formed by an n-channel metal oxide semiconductor (MOS)-type TFT. The insulating film 15 is provided between the pixel electrodes PE and the drive electrodes Tx illustrated in FIG. 3, and these components form holding capacitors Cs illustrated in FIG. 4.

Color regions colored with three colors of red (R), green (G), and blue (B), for example, are periodically arrayed as the color filters CFR, CFG, and CFB. The color regions of the three colors of R, G, and B as one set are made to respectively correspond to the sub pixels SPX. A set of sub pixels SPX corresponding to the color regions of the three colors configures the pixel PX. The color filters may include color regions of equal to or more than four colors. In this case, the pixel PX may include equal to or more than four sub pixels SPX.

Figure 5:
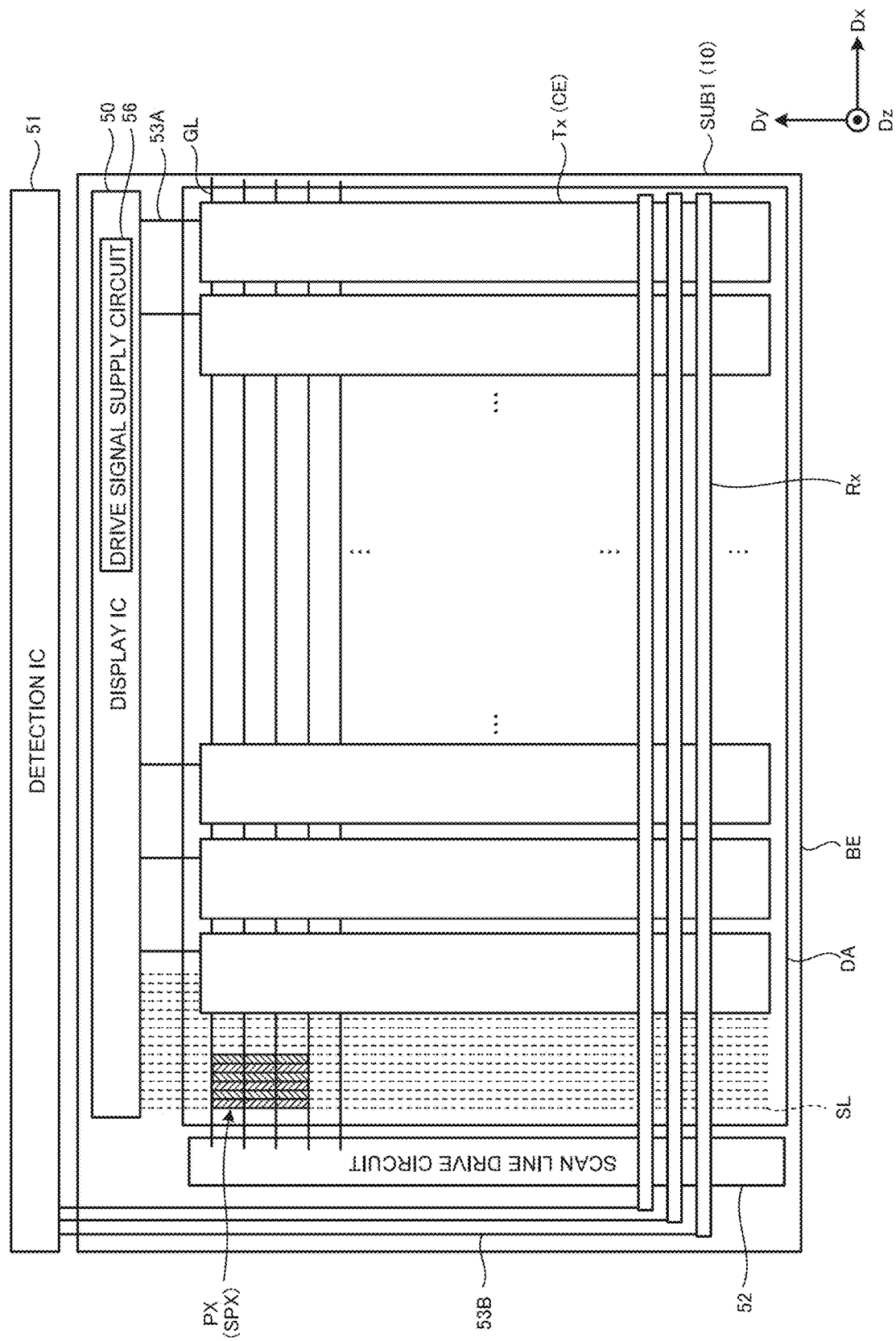
FIG. 5 is a plan view schematically illustrating an array substrate included in the display device.

FIG. 5 is a plan view schematically illustrating the array substrate included in the display device. FIG. 5 schematically illustrates a part of the detection electrodes Rx provided on the counter substrate SUB2 in order to explain the relation between the drive electrodes Tx and the detection electrodes Rx. As illustrated in FIG. 5, the pixels PX (sub pixels SPX) are arrayed in a matrix with a row-column configuration in the display region DA. The pixel signal lines SL and the scan lines GL are provided so as to correspond to the pixel electrodes PE and the switching elements Tr that the sub pixels SPX have. The pixel signal lines SL are coupled to the control circuit such as the display IC 50 provided in the peripheral region BE. A scan line drive circuit 52 is provided in a region extending along the second direction Dy in the peripheral region BE. The scan lines GL are coupled to the scan line drive circuit 52. The scan line drive circuit 52 is a circuit configured to supply the scan signal for driving the switching elements Tr of the pixels PX (sub pixels SPX) to the scan lines GL.

Each of the drive electrodes Tx extends in the second direction Dy and is aligned in the first direction Dx. The drive electrodes Tx are coupled to the display IC 50 through respective coupling wiring lines 53A. Each of the detection electrodes Rx extends in the first direction DX and is aligned in the second direction Dy. The detection electrodes Rx are coupled to the detection IC 51 through coupling wiring lines 53B. The drive electrodes Tx and the detection electrodes Rx are provided so as to intersect with each other in a plan view. An electrostatic capacitance is formed in each of intersecting portions of the drive electrodes Tx and the detection electrodes Rx. The detection IC 51 can detect the detection target based on the detection signals Vdet that are output in accordance with change in the mutual electrostatic capacitances between the drive electrodes Tx and the detection electrodes Rx.

Although FIG. 5 illustrates only some drive electrodes Tx, some detection electrodes Rx, and some pixels PX (sub pixels SPX) in order to make the drawing easy to view, the drive electrodes Tx, the detection electrodes Rx, and the pixels PX are arranged on the entire display region DA. That is to say, the pixels PX are arranged so as to overlap with one drive electrode Tx. One drive electrode Tx is arranged so as to overlap with the pixel signal lines SL.

The drive electrodes Tx serve as the common electrodes CE for forming an electric field between the drive electrodes Tx and the pixel electrodes PE in display and as the drive electrodes Tx for detecting the detection target such as the finger Fg and the input support device 3 in touch detection. To be specific, the display IC 50 supplies a display drive signal VCOM to the drive electrodes Tx in display. The display IC 50 includes at least a drive signal supply circuit 56. The drive signal supply circuit 56 supplies a detection drive signal VD to the drive electrodes Tx in order. Details of driving of the drive electrodes Tx will be described later.

Figure 6:
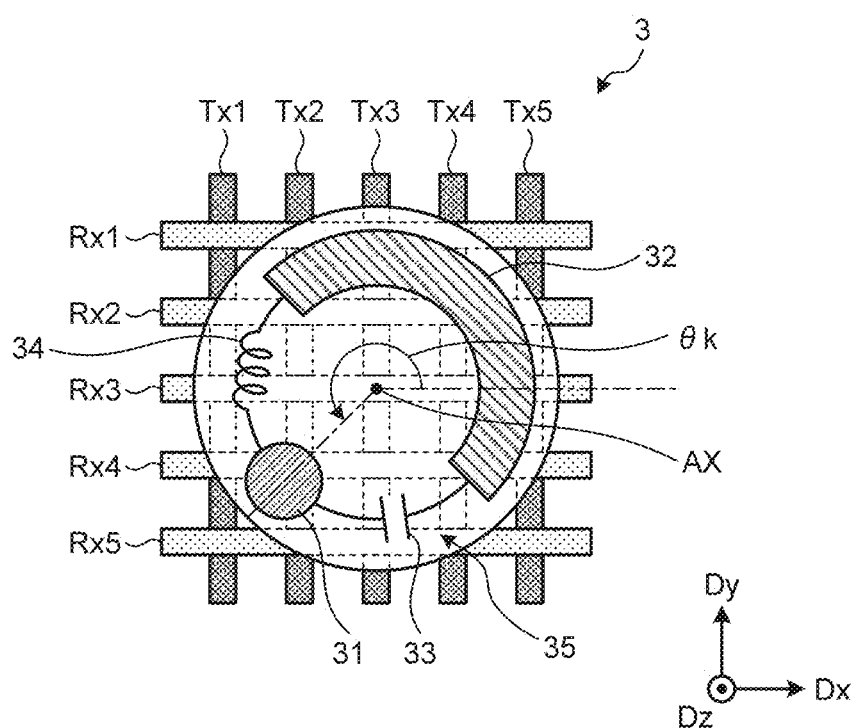
FIG. 6 is a plan view schematically illustrating an input support device, a plurality of drive electrodes, and a plurality of detection electrodes.

Next, a method for detecting the input support device 3 will be described with reference to FIG. 6 to FIG. 9. FIG. 6 is a plan view schematically illustrating the input support device, a plurality of drive electrodes, and a plurality of detection electrodes. The input support device 3 has a circular shape in a plan view as illustrated in FIG. 6. The first electrode 31 and the second electrode 32 are arranged on the opposite sides with respect to the rotating axis AX in a plan view. The first electrode 31 and the second electrode 32 have different shapes and areas in a plan view.

To be specific, the first electrode 31 has a circular shape in a plan view. The second electrode 32 has a curved shape curved in a circular arc form (C-shaped form) along the inner circumference of the housing 30 (refer to FIG. 7). The first electrode 31 is arranged on a circumference formed by virtually extending the circular arc configuring the second electrode 32 and is arrange between one end side and the other end side of the second electrode 32 along the circular arc form. The second electrode 32 has a larger area than that of the first electrode 31. The number of drive electrodes Tx overlapping with the first electrode 31 is therefore different from the number of drive electrodes Tx overlapping with the second electrode 32.

Alternatively, the total area of the drive electrodes Tx overlapping with the first electrode 31 is different from the total area of the drive electrodes Tx overlapping with the second electrode 32. In the example illustrated in FIG. 6, the first electrode 31 is arranged so as to overlap with one drive electrode Tx (Tx2), and the second electrode 32 is arranged so as to overlap with four drive electrodes Tx (Tx2, Tx3, Tx4, and Tx5). The shapes of the first electrode 31 and the second electrode 32 are not limited to the example illustrated in FIG. 6 and may be another shapes such as square shapes and polygonal shapes.

The capacitor 33 configuring the LC circuit 35 is coupled between the first electrode 31 and one end side of the second electrode 32. The inductor 34 is coupled between the first electrode 31 and the other end side of the second electrode 32. FIG. 6 equivalently illustrates the capacitor 33 and the inductor 34 configuring the LC circuit 35, and, for example, the LC circuit 35 may be formed by a chip component mounted on a substrate. It is sufficient that the capacitor 33 and the inductor 34 are coupled electrically in parallel between the first electrode 31 and the second electrode 32, and arrangement thereof in the housing 30 may be desirably set.

Figure 7:
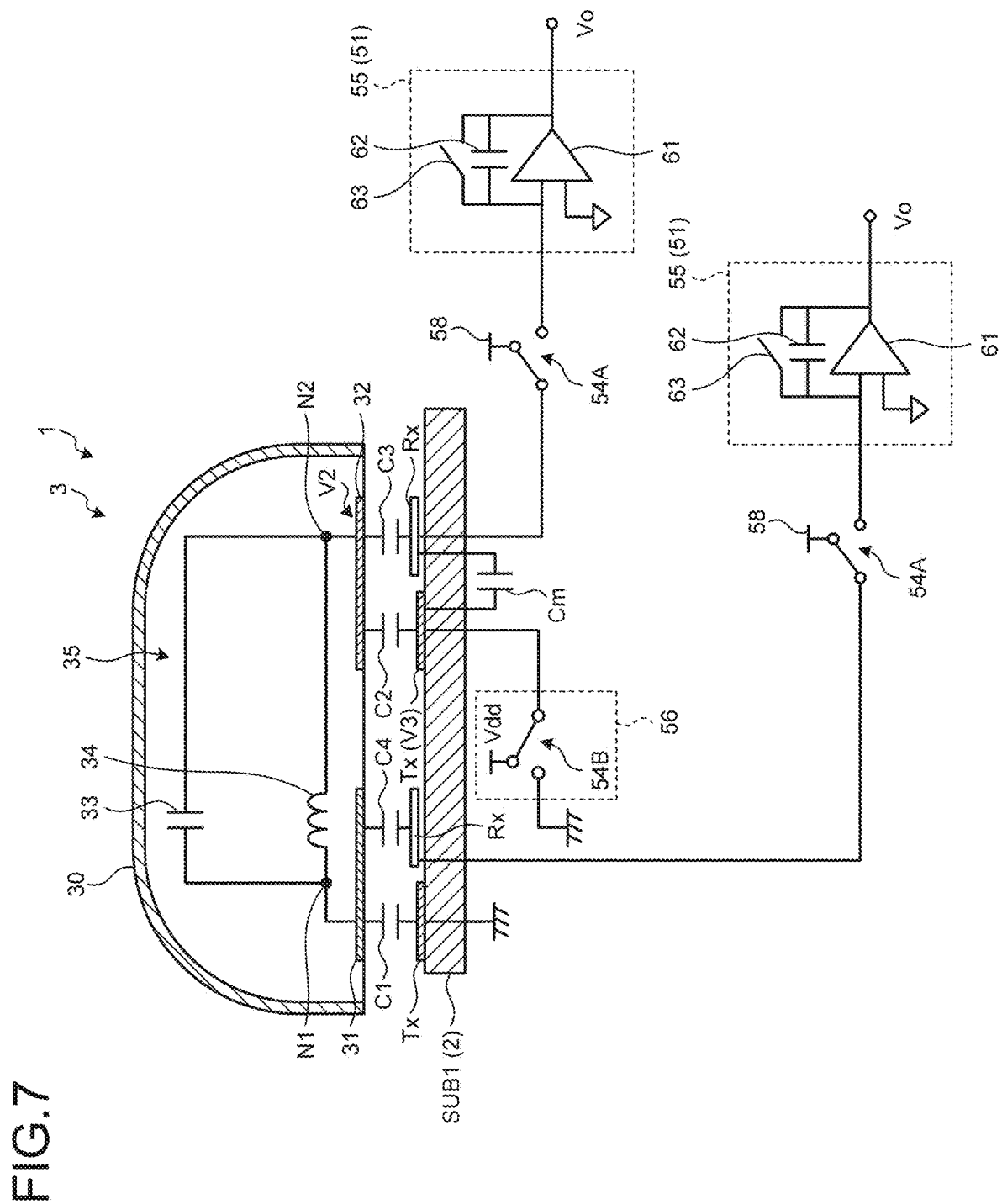
FIG. 7 is a descriptive view for explaining a method for detecting the input support device.

FIG. 7 is a descriptive view for explaining a method for detecting the input support device. As illustrated in FIG. 7, each of the first electrode 31 and the second electrode 32 of the input support device 3 faces both of the drive electrode Tx of the array substrate SUB1 and the detection electrode Rx of the counter substrate SUB2 at a certain timing in a touch detection period (a first detection period TP1 and a second detection period TP2).

The input support device 3 is arranged so as to overlap with the drive electrodes Tx and the detection electrodes Rx. A capacitance C1 is formed between the first electrode 31 and one drive electrode Tx (the drive electrode Tx on the left side in FIG. 7). The one drive electrode Tx is coupled to a reference potential (for example, a reference potential Vdc). A capacitance C2 is formed between the second electrode 32 and the other drive electrode Tx (the drive electrode Tx on the right side in FIG. 7). The other drive electrode Tx is coupled to a power supply potential Vdd or the reference potential (for example, the reference potential Vdc) through a switch element 54B.

A capacitance C3 is formed between the second electrode 32 and the detection electrode Rx facing the second electrode 32. Each of the detection electrodes Rx (the detection electrode Rx on the right side in FIG. 7 and the detection electrode Rx on the left side in FIG. 7) is coupled to the detection circuit 55 or another node 58 through each switch element 54A. The node 58 is coupled to, for example, a reference potential GND (for example, a ground potential) or the reference potential Vdc. The node 58 may be coupled to wiring that is coupled to a non-inverting input portion of a detection signal amplifier 61, which will be described later, instead of the reference potentials. Thus, when the detection electrode Rx is coupled to the node 58, an output-side potential of the detection electrode Rx becomes the same as a potential of the non-inverting input portion of the detection signal amplifier 61. A configuration in which the node 58 is coupled to a floating electrode or a high-impedance (Hi-z) circuit or the switch element 54A is not coupled to the node 58 to bring the detection electrode Rx into a floating state in periods other than a period where it is coupled to the detection circuit 55 can be also employed. The switch elements 54A that are respectively coupled to the detection electrodes Rx are controlled to be switched into ON or OFF states synchronously. A mutual electrostatic capacitance Cm is formed between the drive electrode Tx and the detection electrode Rx. A capacitance C4 is formed between the first electrode 31 and the detection electrode Rx facing the first electrode 31.

The detection circuit 55 is a signal processing circuit provided in the detection IC 51 and is a circuit that receives the detection signals Vdet (refer to FIG. 9) output from the detection electrodes Rx and performs predetermined signal processing thereon to output an output signal Vo. The detection circuit 55 includes a detection signal amplifier 61, a capacitive element 62, and a reset switch 63. The detection circuit 55 is not limited thereto and may further include an A/D convertor (not illustrated) that converts an analog signal output from the detection signal amplifier 61 into a digital signal.

Figure 8:
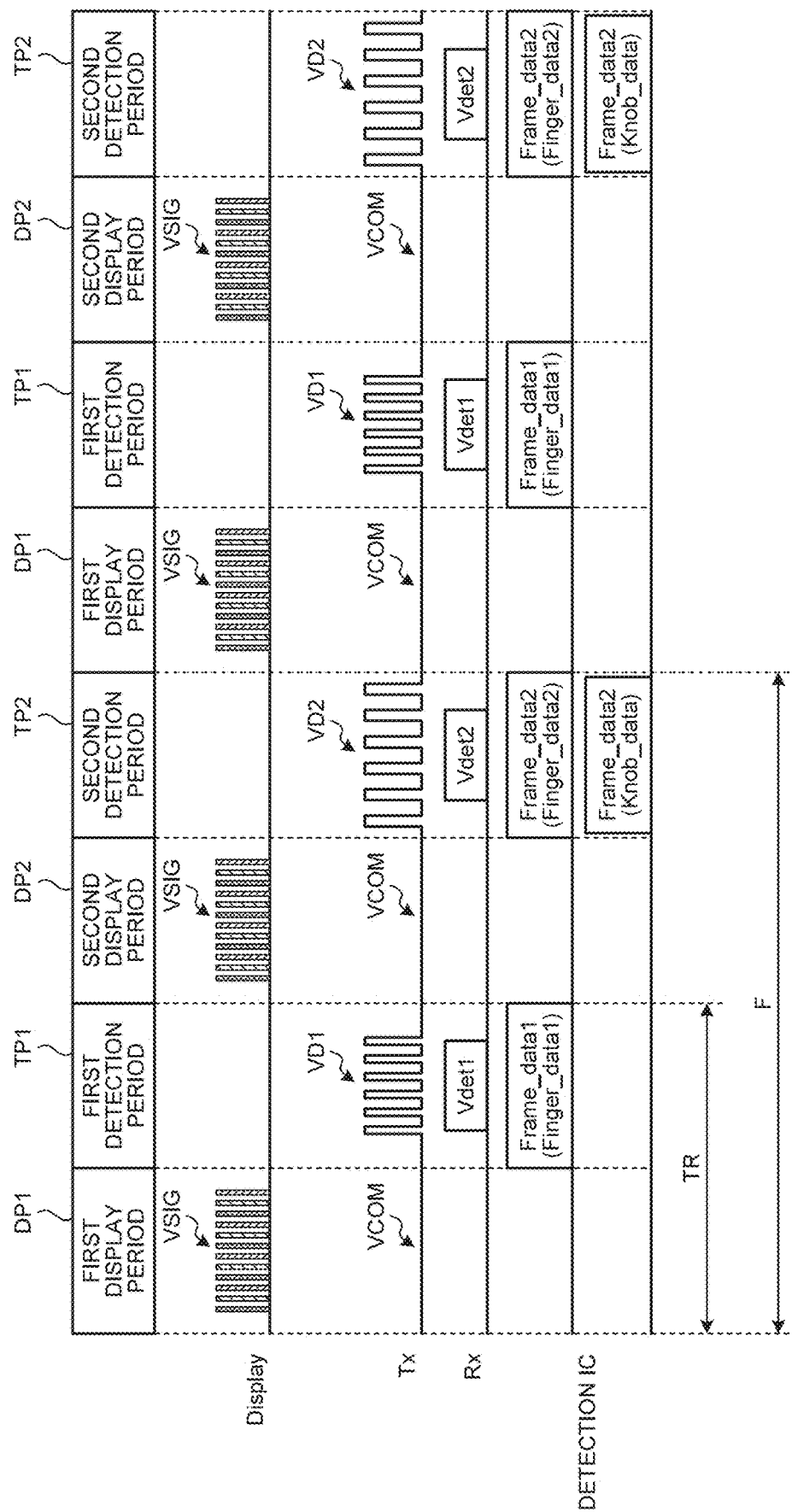
FIG. 8 is a timing waveform chart for explaining a display period and a detection period of the input detection system.

FIG. 8 is a timing waveform chart for explaining a display period and a detection period of the input detection system. As illustrated in FIG. 8, the input detection system 1 executes display operations and detection operations in a time division manner in one frame period F. A first display period DP1, a first detection period TP1, a second display period DP2, and a second detection period TP2 are arranged in this order in the frame period F. Although each display period and each detection period have the same length in FIG. 8, the lengths thereof are schematically illustrated. Actually, any one of each display period and each detection period may be longer than the other one.

The display IC 50 (refer to FIG. 5) supplies image signals VSIG to the pixels PX (sub pixels SPX) through the signal lines SL in the first display period DP1 and the second display period DP2. The display operation of some images among images for one frame is performed in the first display period DP1. The display operation of the remaining images among the images for one frame is performed in the second display period DP2. A display drive signal VCOM is supplied to all of the drive electrodes Tx in the first display period DP1 and the second display period DP2.

The first detection period TP1 is arranged between the first display period DP1 and the second display period DP2. The detection target such as the finger Fg is detected in the first detection period TP1. To be specific, the drive signal supply circuit 56 (refer to FIG. 5) supplies, to the drive electrodes Tx one after another, a first detection drive signal VD1 having a frequency (non-resonant frequency) different from the resonant frequency of the LC circuit 35 in the input support device 3. The detection electrodes Rx output, to the detection IC 51, change in the mutual electrostatic capacitances between the drive electrodes Tx and the detection electrodes Rx as detection signals Vdet1.

The detection IC 51 performs signal processing on the detection signals Vdet1 output from the detection electrodes Rx. The detection IC 51 calculates first frame data (Frame_data1) formed by a plurality of signal values based on the detection signals Vdet1 for one frame. The detection IC 51 can detect presence of the detection target such as the finger Fg and positional information thereof by comparing the signal values on which the calculation processing has been performed with a predetermined threshold. Touch detection for one frame, that is, the overall detection region (display region DA) is performed in one first detection period TP1.

The second detection period TP2 is arranged between the second display period DP2 and the first display period DP1 in the subsequent frame period F. The input support device 3 and the detection target such as the finger Fg are detected in the second detection period TP2. To be specific, the drive signal supply circuit 56 (refer to FIG. 5) supplies, to the drive electrodes Tx one after another, a second detection drive signal VD2 having the resonant frequency of the LC circuit 35 in the input support device 3. The detection electrodes Rx output detection signals Vdet2 based on change in the mutual electrostatic capacitances between the drive electrodes Tx and the detection electrodes Rx. The detection electrodes Rx output the detection signals Vdet2 based on resonance of the LC circuit 35 in a region in which the input support device 3 is arranged.

The detection IC 51 performs signal processing on the detection signals Vdet2 output from the detection electrodes Rx. The detection IC 51 calculates second frame data (Frame_data2) formed by a plurality of signal values based on the detection signals Vdet2 for one frame. The detection IC 51 can detect information related to a position and a rotation angle of the input support device 3 by comparing the signal values on which the calculation processing has been performed with a predetermined threshold. The detection target such as the finger Fg can be detected by utilizing the second frame data used in the detection of the input support device 3 in the second detection period TP2. That is to say, the detection IC 51 can detect the position or the like of the input support device 3 and the finger Fg by utilizing the change in the mutual electrostatic capacitances and the resonance of the LC circuit 35 included in the input support device 3. Detection for one frame, that is, the overall detection region (display region DA) is performed in one second detection period TP2. That is to say, a detection report rate TR of the detection target such as the finger Fg has the length of about half of the frame period F.

The timing waveform chart illustrated in FIG. 8 is merely an example and can be appropriately changed. For example, one display period DP may be continuously arranged in one frame period F. Alternatively, one of the first detection period TP1 and the second detection period TP2 may be arranged in one frame period F. When the first detection drive signal VD1 and the second detection drive signal VD2 need not to be distinguished from each other for explanation, they can be referred to as detection drive signals VD simply. When the first detection period TP1 and the second detection period TP2 need not to be distinguished from each other for explanation, they can be referred to as detection periods TP simply.

Figure 9:
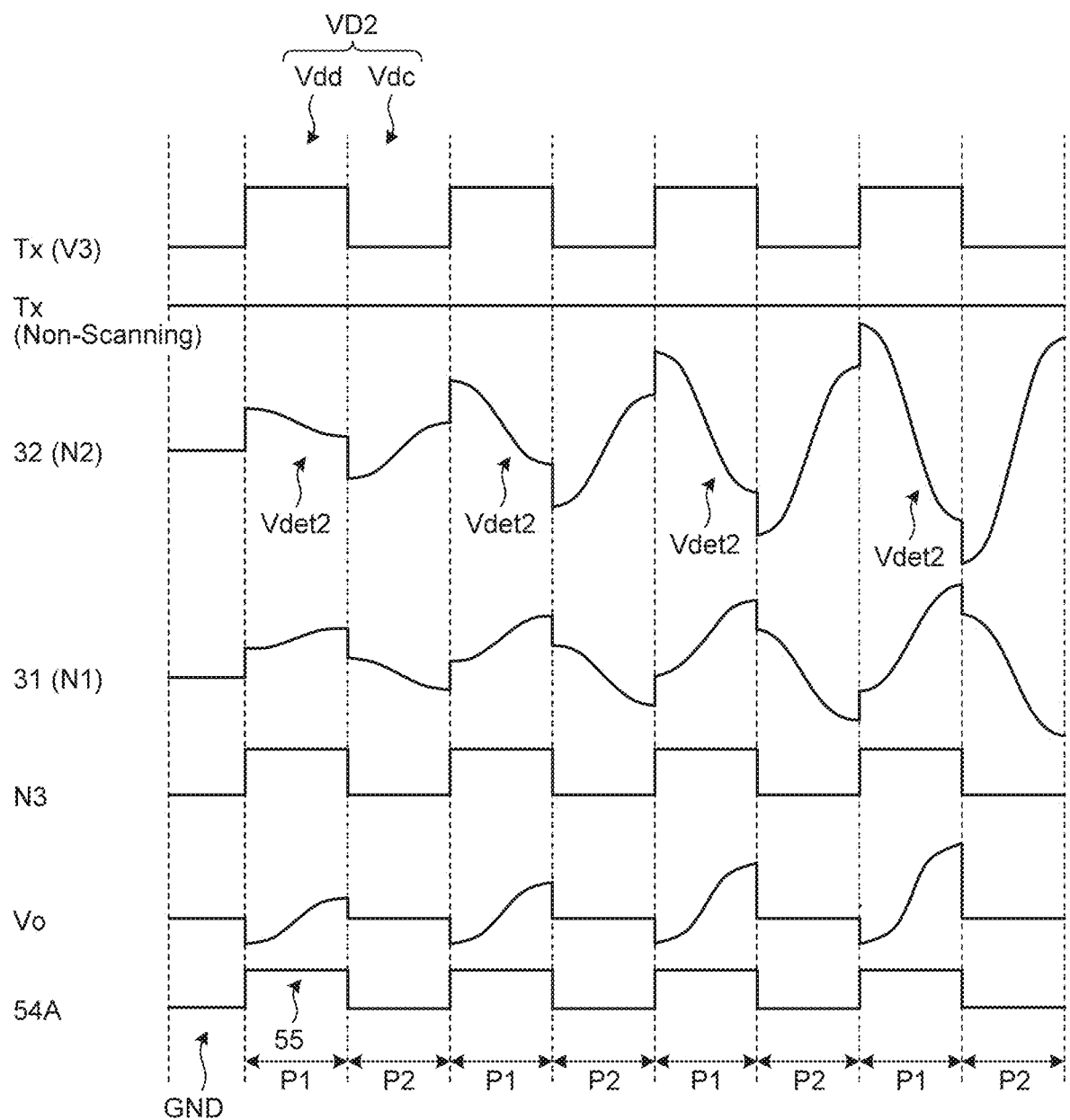
FIG. 9 is a timing waveform chart for explaining the method for detecting the input support device.

Next, a method for detecting the input support device 3 in the second detection period TP2 will be described with reference to FIG. 7 and FIG. 9. FIG. 9 is a timing waveform chart for explaining the method for detecting the input support device.

As illustrated in FIG. 7 and FIG. 9, the second detection drive signal VD2 of an alternate rectangular wave (a pulse wave) is supplied to the other drive electrode Tx (the drive electrode Tx on the right side in FIG. 7) by an operation of the switch element 54B. To be more specific, the power supply potential Vdd at a high level potential and the reference potential Vdc at a low level potential are alternately applied repeatedly at a predetermined frequency with a switching operation of the switch element 54B, so that the second detection drive signal VD2 is formed and is supplied to the other drive electrode Tx. A potential V3 of the other drive electrode Tx varies in accordance with the second detection drive signal VD2. Periods that are repeated in synchronization with the second detection drive signal VD2 are a first period P1 and a second period P2. The first period P1 is a period in which the other drive electrode Tx is coupled to the power supply potential Vdd (a period in which the switch element 54B couples the other drive electrode Tx and the power supply potential Vdd). The second period P2 is a period in which the other drive electrode Tx is coupled to the reference potential Vdc (a period in which the switch element 54B couples the other drive electrode Tx and the reference potential (ground potential)). The power supply potential Vdd is higher than the reference potential Vdc, for example. Although the second detection drive signal VD2 is formed by a combination of one-time input of the power supply potential Vdd and one-time input of the reference potential Vdc in FIG. 9, it is needless to say that the configuration in which they are repeated a plurality of number of times can also be regarded as the second detection drive signal VD2.

The detection electrode Rx outputs the detection signals Vdet2 based on the mutual electrostatic capacitance Cm. To be specific, one drive electrode Tx (the drive electrode Tx on the left side in FIG. 7) is coupled to the reference potential (for example, the reference potential Vdc) in both of the first period P1 and the second period P2, as described above. Signals at different potentials are thereby supplied to the first electrode 31 and the second electrode 32 in the first period P1. The detection electrode Rx is coupled to the detection circuit 55 with the switching operation of the switch element 54A in the first period P1. With this configuration, variation in a potential based on the mutual electrostatic capacitance Cm is output, as the detection signals Vdet2, to the detection circuit 55 from the detection electrode Rx. Coupling between the detection electrode Rx and the detection circuit 55 is interrupted with the switching operation of the switch element 54A in the second period P2. The detection electrode Rx is coupled to the reference potential GND with the switching operation of the switch element 54A in the second period P2.

The detection signal amplifier 61 of the detection circuit 55 amplifies the detection signals Vdet2 supplied from the detection electrode Rx. A reference voltage having a fixed potential is input to a non-inverting input portion of the detection signal amplifier 61, and the detection electrode Rx is coupled to an inverting input terminal. A signal that is the same as that to one drive electrode Tx is input as the reference voltage in the present embodiment. The detection circuit 55 can reset charges of the capacitive element 62 by turning the reset switch 63 ON.

The second detection drive signal VD2 has the same frequency as the resonant frequency of the LC circuit 35. In the present embodiment, the switching operation of the switch element 54B is performed based on the resonant frequency to form the second detection drive signal VD2 having the resonant frequency. The second electrode 32 overlapping with the other drive electrode Tx is also driven at the resonant frequency, so that resonance of the LC circuit 35 is generated. With this configuration, the amplitudes of the detection signals Vdet2 are thereby increased as the first period P1 and the second period P2 are repeated in the detection period. As illustrated in FIG. 9, the amplitudes of the detection signals Vdet2 are increased and the potential of the output signal Vo from the detection circuit 55 varies to be increased as the first period P1 is repeated a plurality of number of times.

With the resonance of the LC circuit 35, the waveform that is generated in the first electrode 31 varies from the waveform that is generated in the second electrode 32 such that the polarities of the first electrode 31 and the second electrode 32 are changed so as to invert from each other. To be specific, the potential of the first electrode 31 varies to be increased and the second electrode 32 varies to be decreased in each first period P1. The potential of the first electrode 31 varies to be decreased and the potential of the second electrode 32 varies to be increased in each second period P2.

Accordingly, the detection signals Vdet2 that are output from the detection electrode Rx overlapping with the first electrode 31 and the output signal Vo (not illustrated) based on the detection signals Vdet2, and the detection signals Vdet2 that are output from the detection electrode Rx overlapping with the second electrode 32 and the output signal Vo (refer to FIG. 9) based on the detection signals Vdet2 have different polarities. In the present embodiment, various pieces of information of the input support device 3 can be detected based on the signal values of the detection signals Vdet2 having different polarities.

On the other hand, when the detection target such as the finger Fg different from the input support device 3 comes into contact with or close to the upper surface 111a (refer to FIG. 1), the detection signals Vdet2 vary in accordance with the change in the mutual electrostatic capacitance Cm. That is to say, since no resonance is generated with the detection of the finger Fg or the like, change in the amplitudes of the detection signals Vdet over time as illustrated in FIG. 8 does not occur. The signal values of the detection signals Vdet2 having the same polarity are detected with the detection of the finger Fg or the like. The input detection system 1 can thus determine whether the detection target is the finger Fg or the input support device 3 using the LC resonance of the LC circuit 35.

Figure 10:
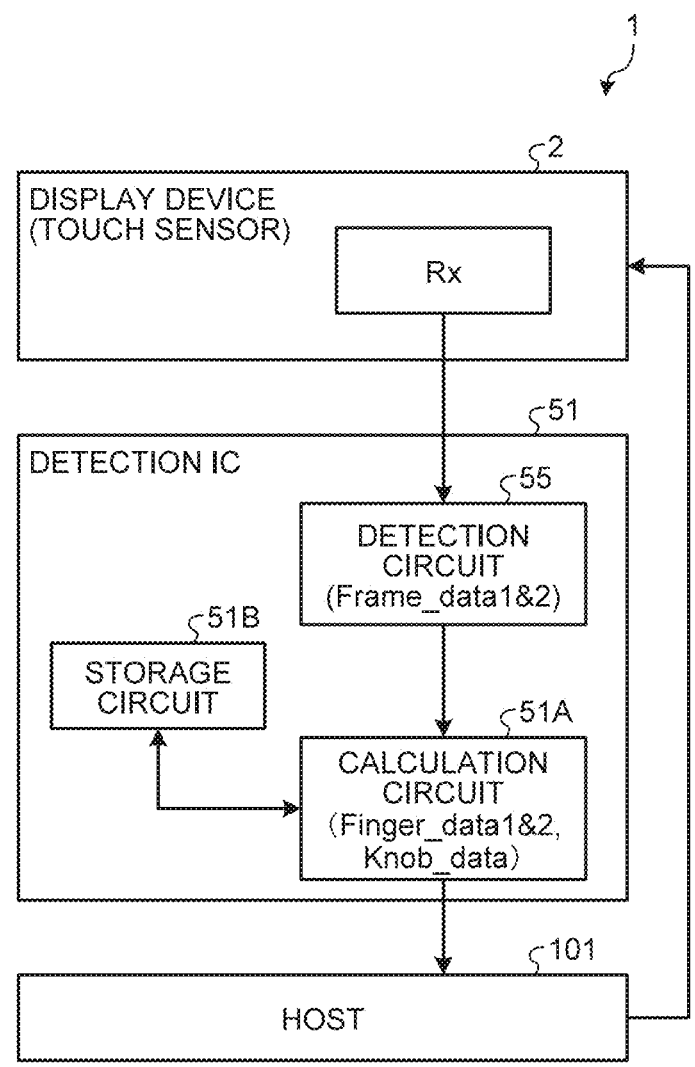
FIG. 10 is a block diagram illustrating an example of the configuration of the input detection system.

FIG. 10 is a block diagram illustrating an example of the configuration of the input detection system. As illustrated in FIG. 10, the detection IC 51 includes a calculation circuit 51A and a storage circuit 51B in addition to the above-mentioned detection circuit 55. The calculation circuit 51A is a circuit configured to receive the pieces of frame data based on the signal values of the detection signals Vdet1 and Vdet2 from the detection circuit 55 and calculate information related to the finger Fg and information related to the input support device 3. The storage circuit 51B is a circuit configured to store therein pieces of information such as a predetermined threshold TH (refer to FIG. 13), distances d1 and d2 (refer to FIG. 18 and the like), and a conversion table (refer to FIG. 22).

The calculation circuit 51A outputs, to a host IC 101, the information related to the finger Fg and the information related to the input support device 3 that have been provided by the calculation. The host IC 101 is a circuit configured to control the display device 2. The host IC 101 outputs, to the display device 2, an instruction to execute an operation in accordance with an input operation based on the information related to the finger Fg and the information related to the input support device 3. The detection IC 51 is controlled to operate in synchronization with the display IC 50 (refer to FIG. 5) based on a control signal from the host IC 101.

The detection IC 51 is not limited to the configuration in which the it calculates the information related to the finger Fg and the information related to the input support device 3, and the host IC 101 as an external circuit may receive the pieces of frame data from the detection IC 51 and calculate the information related to the finger Fg and the information related to the input support device 3.

Figure 11:
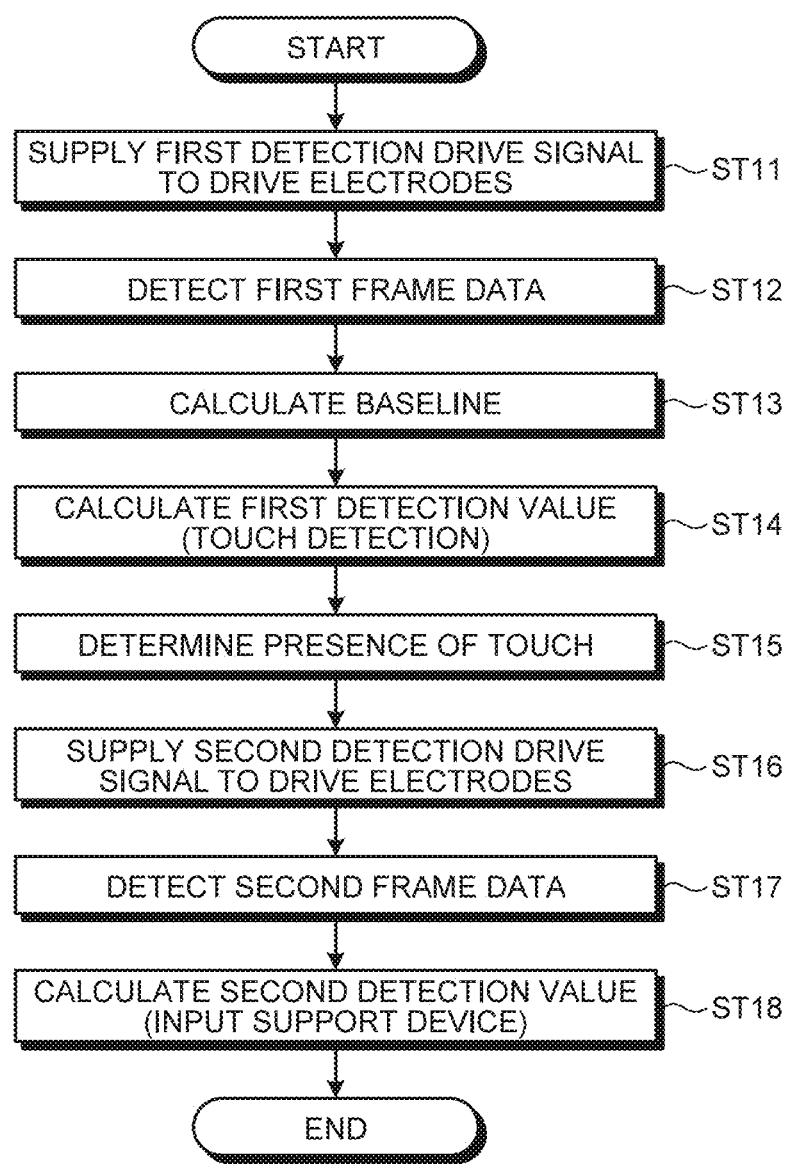
FIG. 11 is a flowchart for explaining a detection method in a first detection period and a second detection period of the input detection system.

Next, a specific method for detecting various pieces of information (position and rotation angle) of the input support device 3 will be described. FIG. 11 is a flowchart for explaining a detection method in the first detection period and the second detection period of the input detection system.

As illustrated in FIG. 11, the drive signal supply circuit 56 (refer to FIG. 5) supplies the first detection drive signal VD1 to the drive electrodes Tx in order in the first detection period TP1 (step ST11).

The detection IC 51 performs the above-mentioned signal processing with the detection circuit 55 based on the detection signals Vdet1 for one frame. The detection IC 51 detects the first frame data based on the signal values of the output signals Vo for one frame that have been provided by the signal processing (step ST12).

The detection IC 51 calculates a baseline based on the first frame data (step ST13) and updates an existing baseline. The calculation of the baseline may be omitted, and it is sufficient that the calculation of the baseline is executed at predetermined timing such as power-on time and recovery time from a sleep mode.

Subsequently, the detection IC 51 performs signal processing on the first frame data to calculate a first detection value (touch detection) (step ST14). The first detection value is, for example, the information related to the detection target such as the finger Fg. The first detection value is calculated by, for example, calculating difference between the first frame data and the baseline or calculating comparison between the first frame data and the predetermined threshold.

Then, the detection IC 51 determines presence of touch of the detection target such as the finger Fg based on the first detection value (step ST15) and calculates a touch position of the detection target such as the finger Fg when the detection target such as the finger Fg is detected.

Thereafter, the drive signal supply circuit 56 (refer to FIG. 5) supplies the second detection drive signal VD2 to the drive electrodes Tx in the second detection period TP2 (step ST16).

The detection IC 51 performs the above-mentioned signal processing with the detection circuit 55 based on the detection signals Vdet2 for one frame. The detection IC 51 detects the second frame data based on the signal values of the output signals Vo for one frame that have been provided by the signal processing in the detection circuit 55 (step ST17).

Subsequently, the detection IC 51 performs signal processing on the second frame data to calculate a second detection value (input support device) (step ST18). The second detection value is, for example, various pieces of information of the input support device 3, such as the position and the rotation angle of the input support device 3. The above-mentioned first detection value (touch detection) is calculated utilizing the second frame data used in the detection of the input support device 3 at step ST18.

Figure 12:
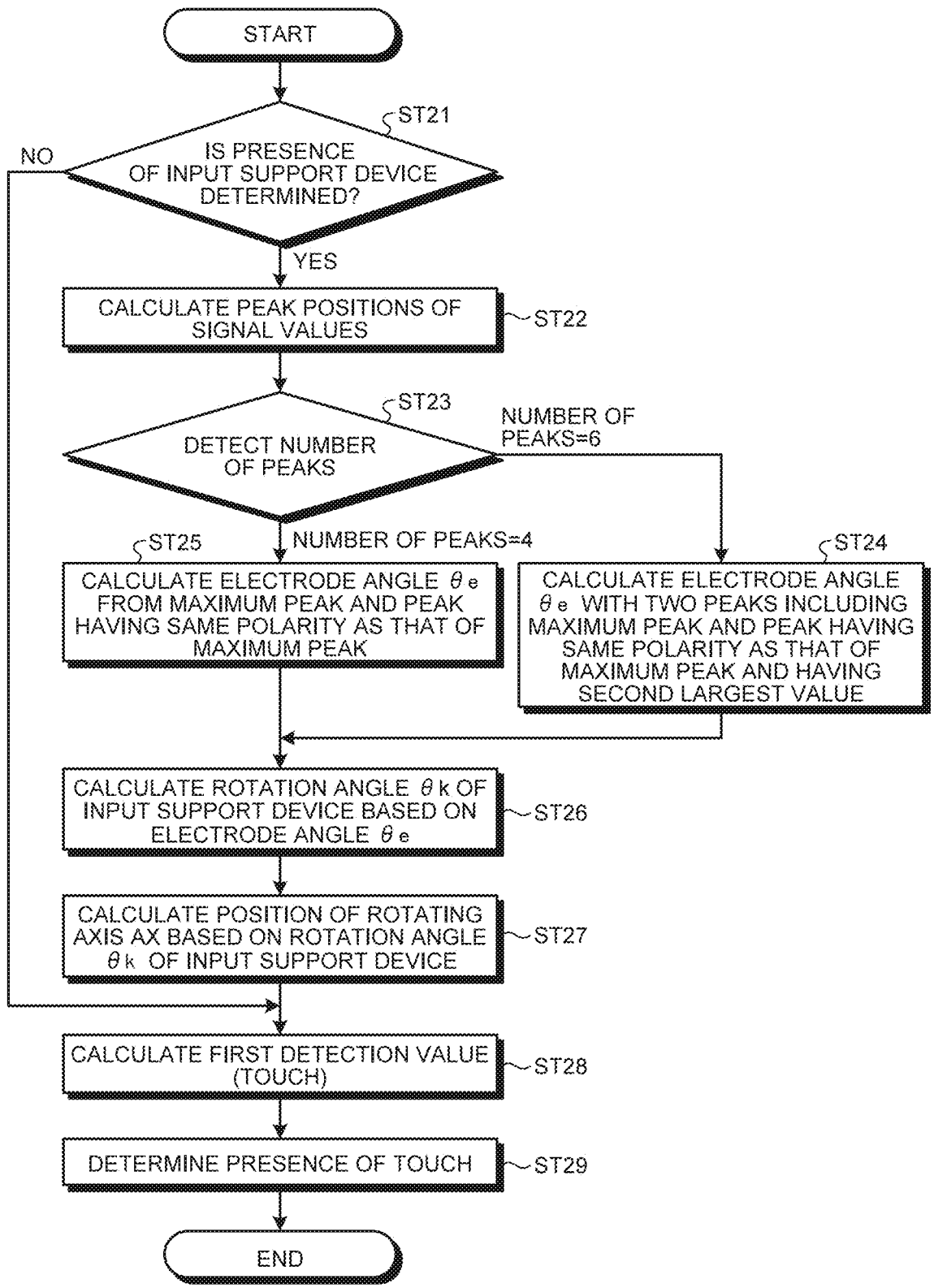
FIG. 12 is a flowchart for explaining a method for detecting various pieces of information of the input support device.
Figure 13:
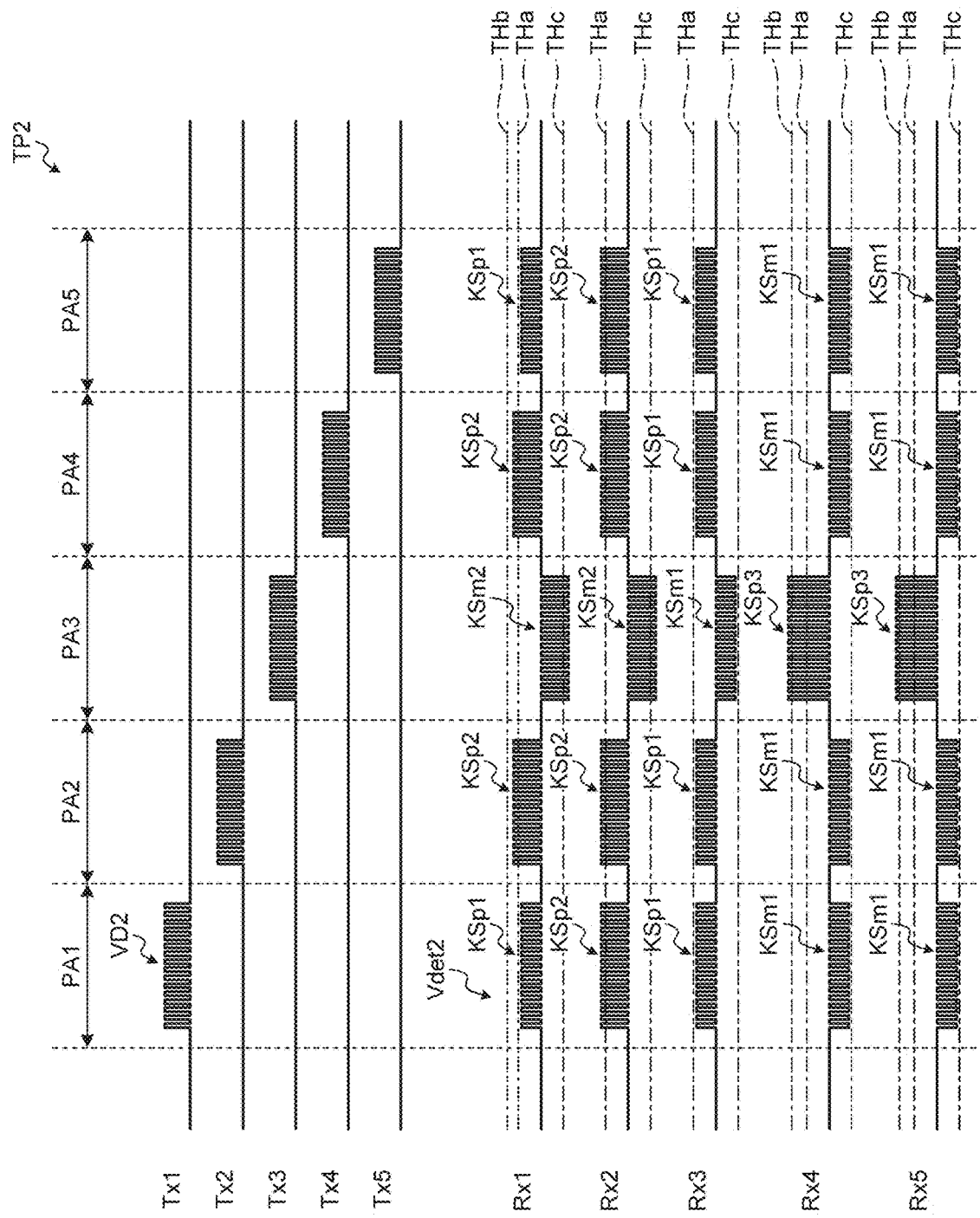
FIG. 13 is a timing waveform chart for explaining the detection method in the second detection period.
Figure 14:
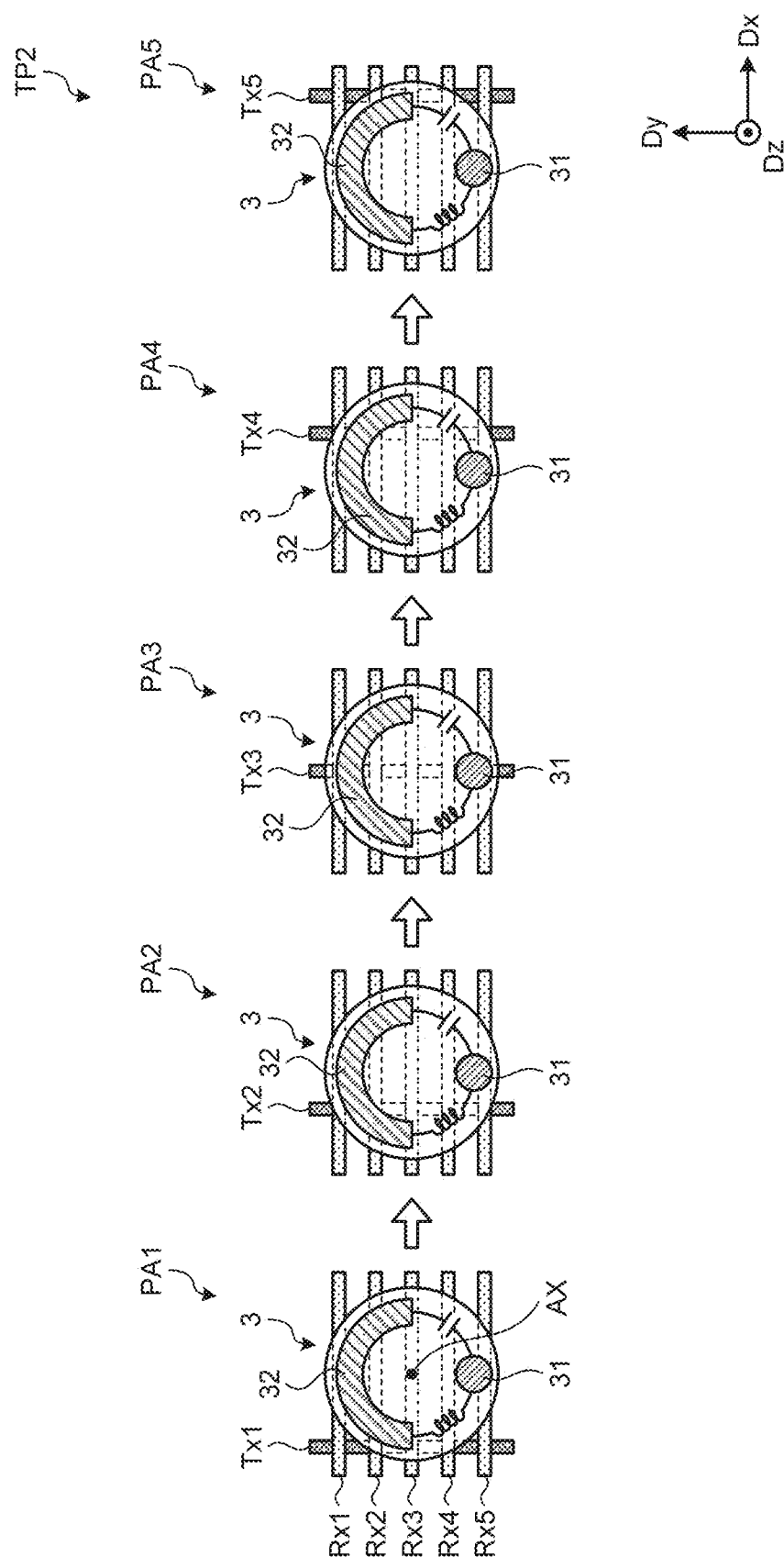
FIG. 14 is a descriptive view for explaining a relation between the drive electrode to which a detection drive signal is supplied and the input support device in each period of the second detection period.
Figure 15:
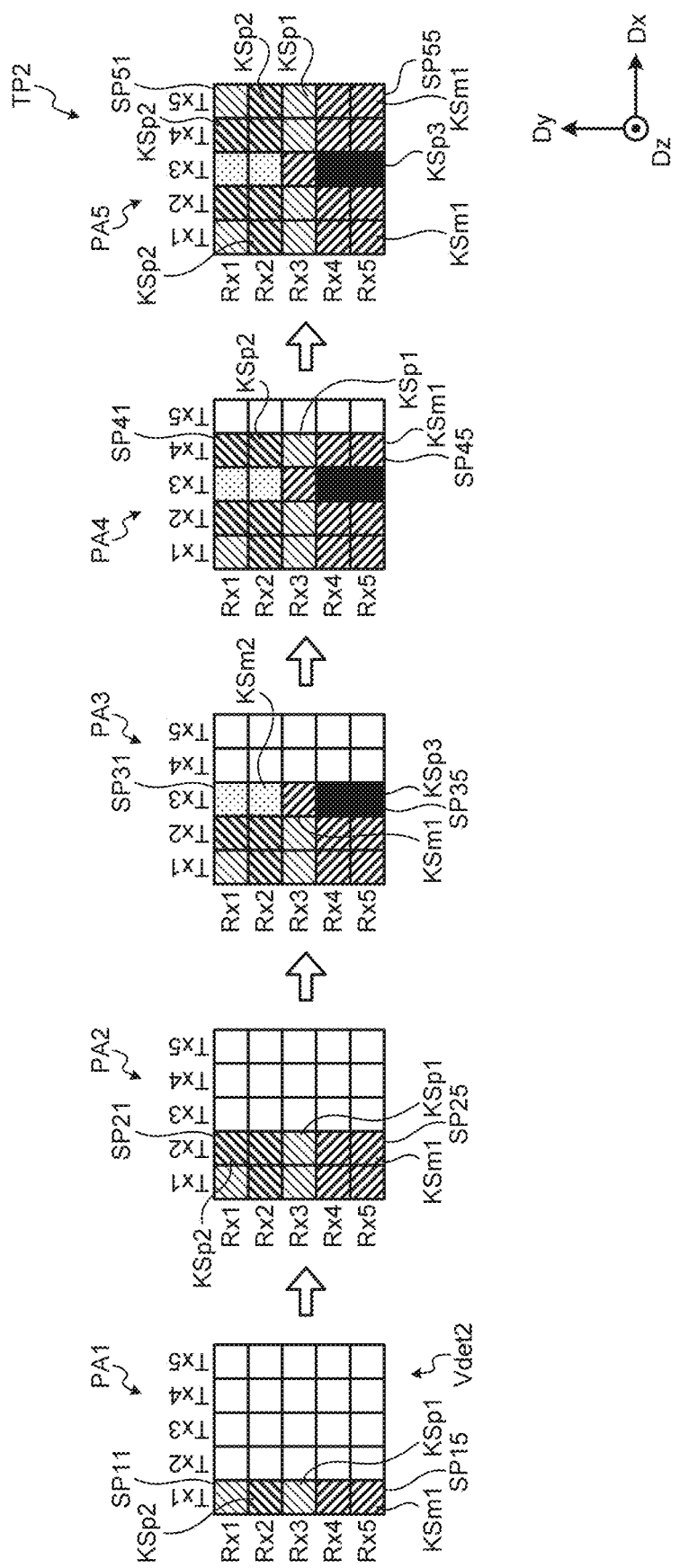
FIG. 15 is a descriptive view for explaining distribution of signal values based on detection signals that are output from the detection electrodes.

A specific example of the calculation of the second detection value will be described with reference to FIG. 12 to FIG. 22. FIG. 12 is a flowchart for explaining a method for detecting various pieces of information of the input support device. FIG. 13 is a timing waveform chart for explaining the detection method in the second detection period. FIG. 14 is a descriptive view for explaining a relation between the drive electrode to which the detection drive signal is supplied and the input support device in each period of the second detection period. FIG. 15 is a descriptive view for explaining distribution of the signal values based on the detection signals that are output from the detection electrodes.

First, as illustrated in FIG. 12, the detection IC 51 determines presence of the input support device 3 based on the second frame data (step ST21). The detection IC 51 determines presence of the input support device 3 utilizing the resonance of the LC circuit 35 included in the input support device 3. It is assumed that the input support device 3 is present on a detection surface with a position and orientation as illustrated in FIG. 14, for example.

To be specific, as illustrated in FIG. 13 and FIG. 14, the drive signal supply circuit 56 (refer to FIG. 5) supplies the second detection drive signal VD2 to the drive electrodes Tx1, Tx2, Tx3, Tx4, and Tx5 in order in respective periods PA1, PA2, PA3, PA4, and PA5 while dividing one second detection period TP2 into the period PA1 to the period PA5 in a time division manner. FIG. 14 illustrates only the drive electrode Tx to which the second detection drive signal VD2 is supplied in each of the periods PA1, PA2, PA3, PA4, and PA5 in order to facilitate the understanding.

As illustrated in FIG. 13 and FIG. 14, the second detection signal VD2 is supplied to the drive electrodes Tx1 and Tx2 overlapping with the second electrode 32 in the respective periods PA1 and PA2. The drive electrode Tx3 overlapping with the first electrode 31 is coupled to the reference potential. As illustrated in FIG. 13, positive-polarity detection signals Vdet2 are output from detection electrodes Rx1, Rx2, and Rx3 overlapping with the second electrode 32 and negative-polarity detection signals Vdet2 are output from detection electrodes Rx4 and Rx5 not overlapping with the second electrode 32 in the periods PA1 and PA2.

The second detection drive signal VD2 is supplied to the drive electrode Tx3 overlapping with the first electrode 31 in the period PA3. The drive electrode Tx3 overlaps also with the second electrode 32, and the second electrode 32 is larger than the first electrode 31 and overlaps also with the other drive electrodes Tx1, Tx2, Tx4, and Tx5 coupled to the reference potential. As a result, the capacitance on the second electrode 32 side is relatively smaller than the capacitance on the first electrode 31 side. Accordingly, the positive-polarity detection signals Vdet2 are output from the detection electrodes Rx4 and Rx5 overlapping with the first electrode 31 and the negative-polarity detection signals Vdet2 are output from the detection electrodes Rx1, Rx2, and Rx3 not overlapping with the second electrode 32 in the period PA3.

The second detection signal VD2 is supplied to the drive electrodes Tx4 and Tx5 overlapping with the second electrode 32 in the respective periods PA4 and PA5. The drive electrode Tx3 overlapping with the first electrode 31 is coupled to the reference potential. The positive-polarity detection signals Vdet2 are output from the detection electrodes Rx1, Rx2, and Rx3 overlapping with the second electrode 32 and the negative-polarity detection signals Vdet2 are output from the detection electrodes Rx4 and Rx5 not overlapping with the second electrode 32 in the periods PA4 and PA5.

As illustrated in FIG. 14, an arrangement relation between the drive electrode Tx to which the second detection drive signal VD2 is supplied and the first electrode 31 and the second electrode 32 is different for each of the periods PA1, PA2, PA3, PA4, and PA5. The polarities of the detection signals Vdet2 that are output from the detection electrodes Rx and the magnitudes of the signal values thereof are different in accordance with the arrangement relation between the drive electrode Tx to which the second detection drive signal VD2 is supplied and the first electrode 31 and the second electrode 32.

As illustrated in FIG. 13, a signal value KSp1 is a signal value of the positive-polarity detection signal Vdet2 (output signal Vo) and is a signal value of smaller than a threshold THa. A signal value KSp2 is a signal value of the positive-polarity detection signal Vdet2 (output signal Vo) and is a signal value of equal to or larger than the threshold THa and smaller than a threshold THb. A signal value KSp3 is a signal value of the positive-polarity detection signal Vdet2 (output signal Vo) and is a signal value of equal to or larger than the threshold THb.

A signal value KSm1 is a signal value of the negative-polarity detection signal Vdet2 (output signal Vo) and is a signal value of larger than a threshold THc, in other words, a signal value having an absolute value smaller than that of the threshold THc. A signal value KSm2 is a signal value of the negative-polarity detection signal Vdet2 (output signal Vo) and is a signal value of equal to or smaller than the threshold THc, in other words, a signal value having an absolute value equal to or larger than that of the threshold THc.

In the following explanation, when the positive-polarity signal values KSp1, KSp2, and KSp3 need not to be distinguished from each other for explanation, they can be referred to as signal values KSp simply. When the negative-polarity signal values KSm1 and KSm2 need not to be distinguished from each other for explanation, they can be referred to as signal values KSm simply.

FIG. 15 schematically illustrates two-dimensional distribution of the signal values KSp and KSm of the detection signals Vdet2 (output signals Vo) for positions SP at which the drive electrodes Tx and the detection electrodes Rx intersect with each other. For example, a position SP11 indicates a position at which the drive electrode Tx1 and the detection electrode Rx1 intersect with each other, and a position SP15 indicates a position at which the drive electrode Tx1 and the detection electrode Rx5 intersect with each other. FIG. 15 omits illustration of some reference numerals of the positions SP for making the drawing easy to view.

As illustrated in FIG. 15, the positive-polarity signal value KSp1 or KSp2 is provided at each of positions SP11, SP12, and SP13 as regions overlapping with the drive electrode Tx1 and the detection electrodes Rx1, Rx2, and Rx3 in the period PA1. The negative-polarity signal value KSm1 is provided at each of positions SP14 and SP15 as regions overlapping with the drive electrode Tx1 and the detection electrodes Rx4 and Rx5.

The positive-polarity signal value KSp1 or KSp2 is provided at each of positions SP21, SP22, and SP23 as regions overlapping with the drive electrode Tx2 and the detection electrodes Rx1, Rx2, and Rx3 in the period PA2. The negative-polarity signal value KSm1 is provided at each of positions SP24 and SP25 as regions overlapping with the drive electrode Tx2 and the detection electrodes Rx4 and Rx5.

The negative-polarity signal value KSm1 or KSm2 is provided at each of positions SP31, SP32, and SP33 as regions overlapping with the drive electrode Tx3 and the detection electrodes Rx1, Rx2, and Rx3 in the period PA3. The positive-polarity signal value KSp3 is provided at each of positions SP34 and SP35 as regions overlapping with the drive electrode Tx3 and the detection electrodes Rx4 and Rx5.

The positive-polarity signal value KSp1 or KSp2 is provided at each of positions SP41, SP42, and SP43 as regions overlapping with the drive electrode Tx4 and the detection electrodes Rx1, Rx2, and Rx3 in the period PA4. The negative-polarity signal value KSm1 is provided at each of positions SP44 and SP45 as regions overlapping with the drive electrode Tx4 and the detection electrodes Rx4 and Rx5.

The positive-polarity signal value KSp1 or KSp2 is provided at each of positions SP51, SP52, and SP53 as regions overlapping with the drive electrode Tx5 and the detection electrodes Rx1, Rx2, and Rx3 in the period PA5. The negative-polarity signal value KSm1 is provided at each of positions SP54 and SP55 as regions overlapping with the drive electrode Tx5 and the detection electrodes Rx4 and Rx5.

The input detection system 1 can thus detect the regions formed by the positive-polarity signal values KSp and the regions formed by the negative-polarity signal values KSm in the two-dimensional distribution of the signal values KSp and KSm of the detection signals Vdet2 (output signals Vo) by the resonance of the LC circuit 35 of the input support device 3. On the other hand, the detection target such as the finger Fg causes no resonance of the LC circuit 35, so that only signal values having one polarity (for example, the positive-polarity signal values KSp) are provided. The detection IC 51 can determine that the input support device 3 is arranged on the display region DA when the regions formed by the positive-polarity signal values KSp and the regions formed by the negative-polarity signal values KSm are detected at step ST21 illustrated in FIG. 12 as described above.

In the example illustrated in FIG. 13 to FIG. 15, the detection IC 51 detects the three positive-polarity signal values KSp1, KSp2, and KSp3 and the two negative-polarity signal values KSm1 and KSm2. It is however merely an example and resolutions of the signal values KSp and KSm can be appropriately changed.

With reference to FIG. 12 again, when the detection IC 51 determines that the input support device 3 is present based on the second frame data (Yes at step ST21), the detection IC 51 calculates peak positions of the signal values KSp and KSm in the two-dimensional distribution of the signal values KSp and KSm of the detection signals Vdet2 (output signals Vo) (step ST22).

Figure 16:
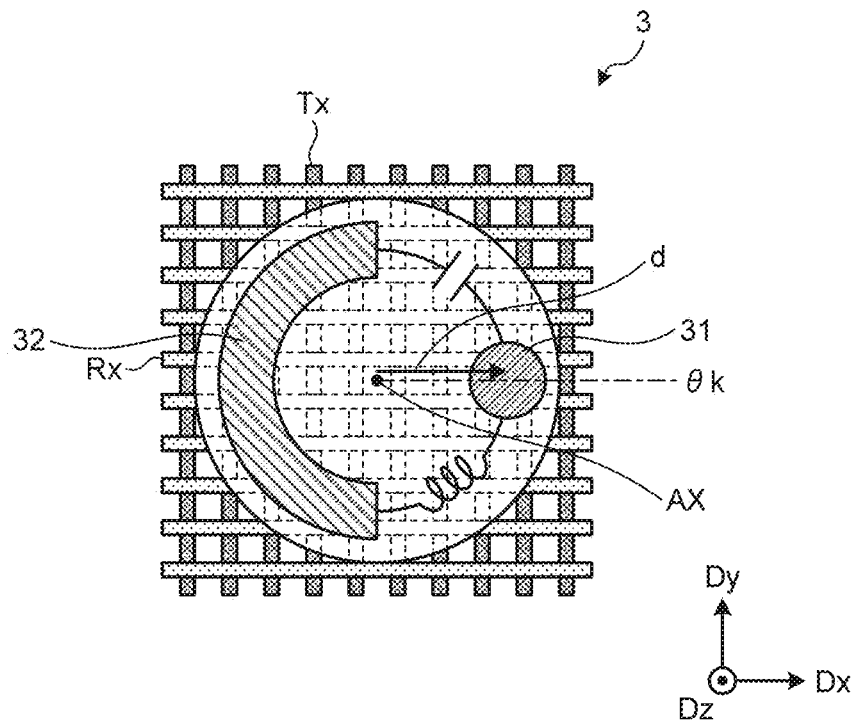
FIG. 16 is a plan view schematically illustrating the input support device, the drive electrodes, and the detection electrodes when a rotation angle of the input support device is 0°.
Figure 17:
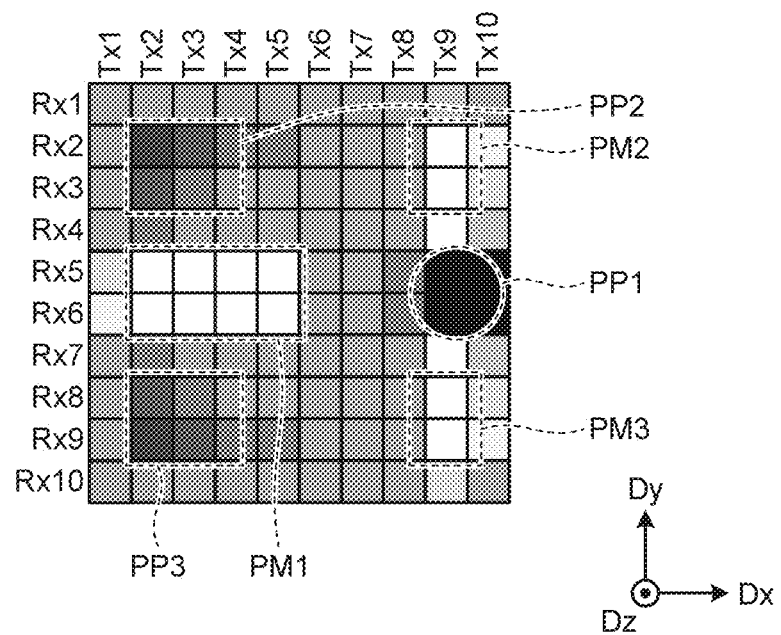
FIG. 17 is a descriptive view for explaining distribution of the signal values when the rotation angle of the input support device is 0°.

Hereinafter, an example of a method for detecting the peak positions of the signal values KSp and KSm and an electrode angle θe will be described with reference to FIG. 16 to FIG. 22. FIG. 16 is a plan view schematically illustrating the input support device, the drive electrodes, and the detection electrodes when the rotation angle of the input support device is 0°. FIG. 17 is a descriptive view for explaining distribution of the signal values when the rotation angle of the input support device is 0°.

A rotation angle θk of the input support device 3 is an angle formed by a virtual line passing through the center (rotating axis AX) of the input support device 3 and parallel with the first direction Dx and a virtual line connecting the center (rotating axis AX) of the input support device 3 and the center of the first electrode 31. For example, the rotation angle θk of the input support device 3 illustrated in FIG. 14 is θk=270°.

FIG. 17 schematically illustrates the magnitudes of the signal values KSp and KSm by monochromatic shade. The monochromatic shade that is closer to black indicates the positive-polarity signal value KSp having a larger absolute value. The monochromatic shade that is closer to white indicates the negative-polarity signal value KSm having a larger absolute value.

As illustrated in FIG. 16 and FIG. 17, when the rotation angle θk of the input support device 3 is 0°, the first electrode 31 is located in the first direction Dx (right side in FIG. 16) with respect to the rotating axis AX. With the above-mentioned detection (refer to FIG. 13 to FIG. 15) in the second detection period TP2, the detection IC 51 detects a first positive-polarity region PP1, a second positive-polarity region PP2, and a third positive-polarity region PP3 formed by the positive-polarity signal values KSp and a first negative-polarity region PM1, a second negative-polarity region PM2, and a third negative-polarity region PM3 formed by the negative-polarity signal values KSm.

In the following explanation, when the first positive-polarity region PP1, the second positive-polarity region PP2, and the third positive-polarity region PP3 need not to be distinguished from each other for explanation, they can be referred to as positive-polarity regions PP simply. When the first negative-polarity region PM1, the second negative-polarity region PM2, and the third negative-polarity region PM3 need not to be distinguished from each other for explanation, they can be referred to as negative-polarity regions PM simply.

The positive-polarity regions PP are peak regions formed by the positive-polarity signal values KSp of equal to or larger than a predetermined threshold. The negative-polarity regions PM are peak regions formed by the negative-polarity signal values KSm of equal to or smaller than a predetermined threshold.

As illustrated in FIG. 16 and FIG. 17, the first positive-polarity region PP1 is a region overlapping with the first electrode 31. The first positive-polarity region PP1 is located between the second negative-polarity region PM2 and the third negative-polarity region PM3 in the second direction Dy. The first negative-polarity region PM1 is a region overlapping with the second electrode 32 and is a region in the vicinity of the center of the second electrode 32 in the extension direction. The first negative-polarity region PM1 is located between the second positive-polarity region PP2 and the third positive-polarity region PP3 in the second direction Dy.

The positive-polarity regions PP and the negative-polarity regions PM having different polarities are arranged so as to be adjacent to each other in the first direction Dx or the second direction Dy. The positive-polarity regions PP having the same polarity are arranged so as to be adjacent to each other diagonally (in the oblique direction). The negative-polarity regions PM having the same polarity are arranged so as to be adjacent to each other diagonally (in the oblique direction).

Figure 18:
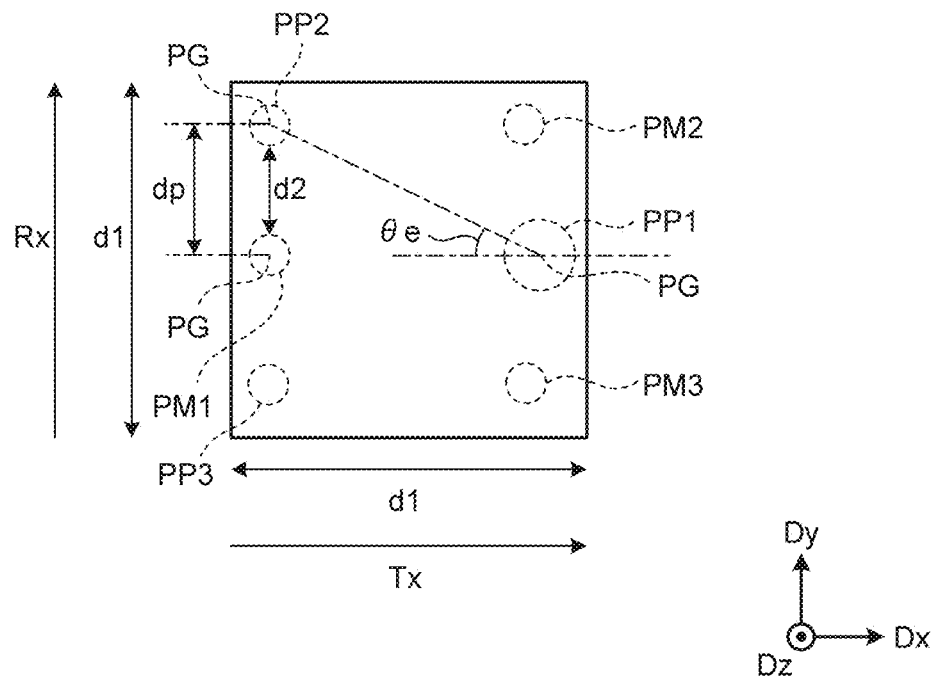
FIG. 18 is a descriptive view for explaining a method for detecting an electrode angle based on a plurality of peak regions when the rotation angle of the input support device is 0°.

FIG. 18 is a descriptive view for explaining a method for detecting the electrode angle based on a plurality of peak regions when the rotation angle of the input support device is 0°. FIG. 18 illustrates the peak regions (the positive-polarity regions PP and the negative-polarity regions PM) by dotted circles while omitting the distribution (monochromatic shade) of the signal values KSp and KSm for making the drawing easy to view. The detection IC 51 calculates the gravity centers PG of the positive-polarity regions PP and the negative-polarity regions PM in the two-dimensional distribution of the signal values KSp and KSm and sets positions of the gravity centers PG to be the peak positions of the signal values KSp and KSm.

With reference to FIG. 12 again, the detection IC 51 detects the number of peaks of the signal values KSp and KSm in the two-dimensional distribution of the signal values KSp and KSm of the detection signals Vdet2 (output signals Vo) (step ST23). As illustrated in FIG. 16 to FIG. 18, the number of peaks of the signal values KSp and KSm, that is, the number of the positive-polarity regions PP and the negative-polarity regions PM when the rotation angle of the input support device is 0° is six.

When the number of peaks of the signal values KSp and KSm is six, the detection IC 51 calculates the electrode angle θe using two peaks including a maximum peak and a peak having the same polarity as that of the maximum peak and having a second largest value (step ST24). In the example illustrated in FIG. 16 to FIG. 18, the first positive-polarity region PP1 indicates the maximum signal value KSp and the second positive-polarity region PP2 indicates the signal value KSp having the second largest value.

As illustrated in FIG. 18, the detection IC 51 detects, as the electrode angle θe, an angle formed by a virtual line passing through the gravity center PG of the first positive-polarity region PP1 and parallel with the first direction Dx, and a virtual line connecting the two adjacent positive-polarity regions PP, to be specific, the gravity center PG of the first positive-polarity region PP1 and the gravity center PG of the second positive-polarity region PP2.

In the determination of the presence of the input support device 3 at step ST21 illustrated in FIG. 12, the input support device 3 may be determined to be arranged on the display region DA when the positive-polarity regions PP formed by the positive-polarity signal values KSp and the negative-polarity regions PM formed by the negative-polarity signal values KSm are detected, the peak regions located diagonally have the same polarity, and a peak-to-peak distance dp illustrated in FIG. 18 satisfies the following equation (1).

$$d2 < dp < d1 \qquad (1)$$

The peak-to-peak distance dp is a distance between the gravity center PG of the positive-polarity region PP and the gravity center PG of the negative-polarity region PM, which are adjacent to each other, and is the shortest distance between the gravity centers PG. d1 and d2 are parameters that are determined by a distance between the first electrode 31 and the second electrode 32 included in the input support device 3 and the shapes of the electrodes.

Although, in the above-mentioned example, the case where the number of positive-polarity regions PP and the negative-polarity regions PM are six is described, the number thereof is not however limited thereto. Distribution of the signal values KSp and KSm is detected to be different and the number and positions (gravity centers PG) of the positive-polarity regions PP and the negative-polarity regions PM are also different in accordance with the rotation angle θk of the input support device 3.

Figure 19:
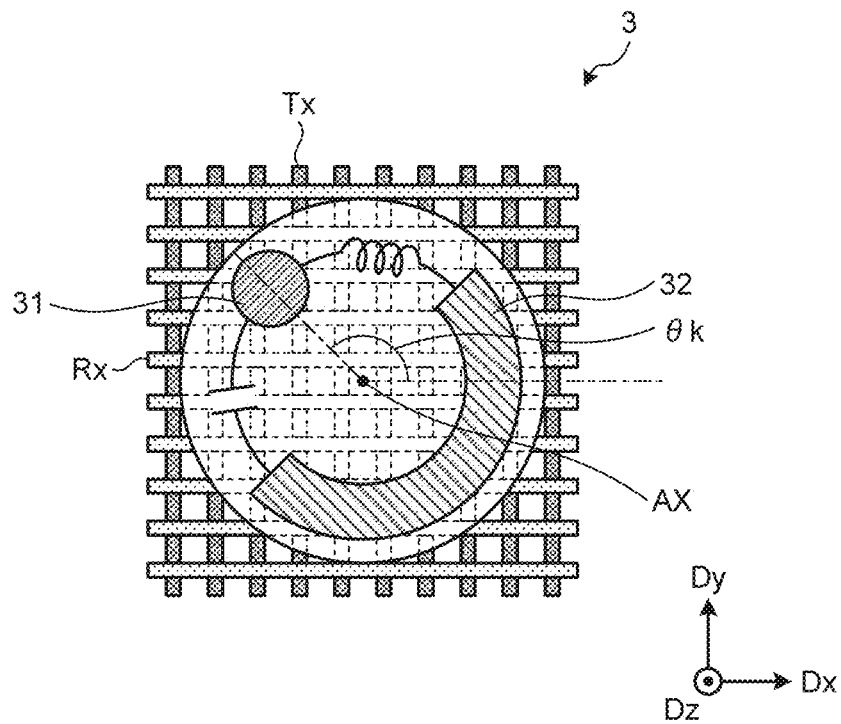
FIG. 19 is a plan view schematically illustrating the input support device, the drive electrodes, and the detection electrodes when the rotation angle of the input support device is 135°.
Figure 20:
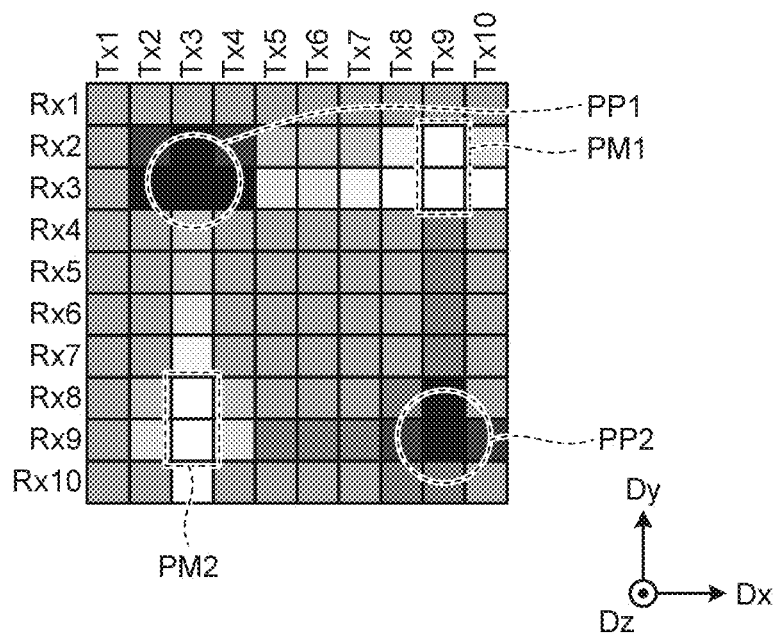
FIG. 20 is a descriptive view for explaining distribution of the signal values when the rotation angle of the input support device is 135°.

FIG. 19 is a plan view schematically illustrating the input support device, the drive electrodes, and the detection electrodes when the rotation angle of the input support device is 135°. FIG. 20 is a descriptive view for explaining distribution of the signal values when the rotation angle of the input support device is 135°.

As illustrated in FIG. 19, when the rotation angle θk of the input support device 3 is 135°, the first electrode 31 is located in the oblique direction (upper left side in FIG. 19) intersecting with the first direction Dx and the second direction Dy with respect to the rotating axis AX of the first electrode 31.

As illustrated in FIG. 20, with the above-mentioned detection (refer to FIG. 13 to FIG. 15) in the second detection period TP2, the first positive-polarity region PP1 and the second positive-polarity region PP2 formed by the positive-polarity signal values KSp, and the first negative-polarity region PM1 and the second negative-polarity region PM2 formed by the negative-polarity signal values KSm are detected.

The first positive-polarity region PP1 is a region overlapping with the first electrode 31. The second positive-polarity region PP2 is a region overlapping with the second electrode 32 and is a region in the vicinity of the center of the second electrode 32 in the extension direction. The second positive-polarity region PP2 is located diagonally to the first positive-polarity region PP1.

The first negative-polarity region PM1 and the second negative-polarity region PM2 are regions in the vicinity of end portions of the second electrode 32 in the extension direction. The first negative-polarity region PM1 is located diagonally to the second negative-polarity region PM2. The first negative-polarity region PM1 is arranged so as to be adjacent to the first positive-polarity region PP1 in the first direction Dx and is arranged so as to be adjacent to the second positive-polarity region PP2 in the second direction Dy. The second negative-polarity region PM2 is arranged so as to be adjacent to the first positive-polarity region PP1 in the second direction Dy and is arranged so as to be adjacent to the second positive-polarity region PP2 in the first direction Dx.

Also when the rotation angle $\theta k$ is 135°, the positive-polarity regions PP and the negative-polarity regions PM having different polarities are arranged so as to be adjacent to each other in the first direction Dx or the second direction Dy. The positive-polarity regions PP having the same polarity are arranged so as to be adjacent to each other diagonally (in the oblique direction). The negative-polarity regions PM having the same polarity are arranged so as to be adjacent to each other diagonally (in the oblique direction).

Figure 21:
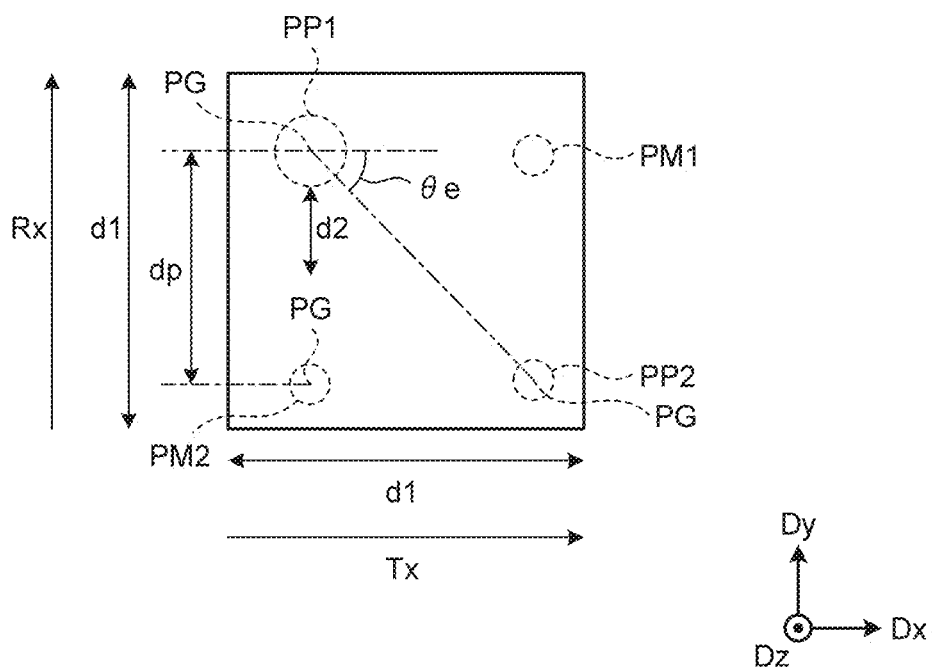
FIG. 21 is a descriptive view for explaining the method for detecting the electrode angle based on the peak regions when the rotation angle of the input support device is 135°.

FIG. 21 is a descriptive view for explaining the method for detecting the electrode angle based on the peak regions when the rotation angle of the input support device is 135°. As illustrated in FIG. 21, the detection IC 51 calculates the gravity centers PG of the positive-polarity regions PP and the negative-polarity regions PM in the two-dimensional distribution of the signal values KSp and KSm and sets the gravity centers PG to be the peak positions of the signal values KSp and KSm (step ST22 in FIG. 12).

The detection IC 51 detects the number of peaks of the signal values KSp and KSm in the two-dimensional distribution of the signal values KSp and KSm of the detection signals Vdet2 (output signals Vo) at step ST23 illustrated in FIG. 12. As illustrated in FIG. 19 to FIG. 21, the number of peaks of the signal values KSp and KSm, that is, the number of the positive-polarity regions PP and the negative-polarity regions PM when the rotation angle of the input support device is 135° is four.

When the number of peaks is four, the detection IC 51 calculates the electrode angle $\theta e$ using two peaks including a maximum peak and a peak having the same polarity as that of the maximum peak (step ST25 in FIG. 12). In the example illustrated in FIG. 19 to FIG. 21, the first positive-polarity region PP1 indicates the maximum signal value KSp and the second positive-polarity region PP2 indicates the signal value KSp having the same polarity as that of the first positive-polarity region PP1. The detection IC 51 detects, as the electrode angle $\theta e$, an angle formed by a virtual line passing through the gravity center PG of the first positive-polarity region PP1 and parallel with the first direction Dx, and a virtual line connecting the gravity center PG of the first positive-polarity region PP1 and the gravity center PG of the second positive-polarity region PP2.

Figure 22:
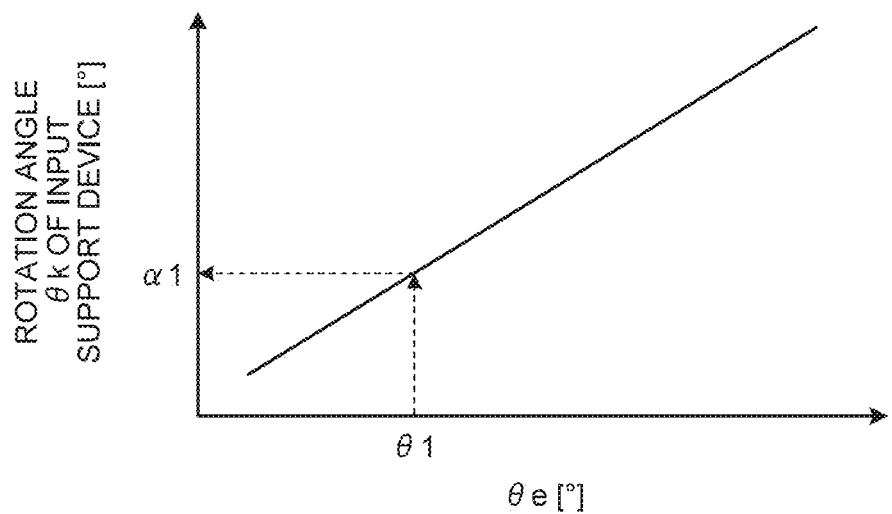
FIG. 22 is a graph illustrating an example of a conversion table indicating a relation between the electrode angle and the rotation angle of the input support device.

Then, with reference to FIG. 12 again, the detection IC 51 calculates the rotation angle $\theta k$ of the input support device 3 based on the electrode angle $\theta e$ (step ST26). FIG. 22 is a graph illustrating an example of a conversion table indicating a relation between the electrode angle and the rotation angle of the input support device. In FIG. 22, a transverse axis indicates the electrode angle $\theta e$ and a longitudinal axis indicates the rotation angle $\theta k$ of the input support device 3. The conversion table illustrated in FIG. 22 is information previously stored in the storage circuit 51B (refer to FIG. 11) of the detection IC 51. The relation between the electrode angle $\theta e$ and the rotation angle $\theta k$ of the input support device 3 in the conversion table is provided by being actually measured in advance. Alternatively, the conversion table may be calculated or corrected with the arrangement and shapes of the first electrode 31 and the second electrode 32 included in the input support device 3.

The detection IC 51 calculates the rotation angle $\theta k$ of the input support device 3 by applying information of the electrode angle $\theta e$ calculated at step ST24 or step ST25 to the conversion table illustrated in FIG. 22. In FIG. 22, the detection IC 51 can calculate the rotation angle $\theta k=\alpha 1$ corresponding to the electrode angle $\theta e=\theta 1$ by applying the calculated electrode angle $\theta e=\theta 1$.

The detection IC 51 is not limited to the method using the conversion table and may calculate the rotation angle $\theta k$ of the input support device 3 by another method, for example, by using an approximate expression.

Then, the detection IC 51 calculates a position of the rotating axis AX based on the rotation angle $\theta k$ of the input support device 3 (step ST27). To be specific, the detection IC 51 calculates the position of the first electrode 31 based on the gravity center PG of the first positive-polarity region PP1 provided at step ST22 as described above. The position of the rotating axis AX, that is, the center position of the input support device 3 can be calculated based on the rotation angle $\theta k$ of the input support device 3 and a radius d (refer to FIG. 16) of the input support device 3 that is determined by the arrangement and shapes of the first electrode 31 and the second electrode 32 with reference to the position of the first electrode 31.

Also at step ST27, the detection IC 51 may calculate the position of the rotating axis AX using a conversion table provided by actual measurement or may calculate the position of the rotating axis AX by using an approximate expression similarly to FIG. 22.

The input detection system 1 can detect the position of the rotating axis AX of the input support device 3 and the rotation angle $\theta k$ thereof with high accuracy with the above-mentioned methods. The flowcharts illustrated in FIG. 11 and FIG. 12 are merely examples and can be appropriately changed. For example, some steps may be omitted, the order of steps may be changed, and so on.

Subsequently, with reference to FIG. 12 again, the detection IC 51 detects the detection target such as the finger Fg using the second frame data based on the detection signals Vdet2 in the second detection period TP2 (steps ST28 and ST29). Similar detection to that at steps ST14 and ST15 as described above is performed at steps ST28 and ST29, and repeated explanation thereof is omitted. When the detection IC 51 determines that the input support device 3 is absent based on the second frame data at step ST21 (No at step ST21), the detection IC 51 can detect the detection target such as the finger Fg using the second frame data based on the detection signals Vdet2 while omitting step ST22 to step ST27. That is to say, a detection report rate of the detection target such as the finger Fg has the length of about half of the frame period F whereas a detection report rate of the input support device 3 is twice as long as the detection report rate of the detection target such as the finger Fg, that is, once in one frame period F.

As described above, the input detection system 1 of the present embodiment includes the drive electrodes Tx and the detection electrodes Rx arrayed in the display region DA (detection region), the input support device 3 including the LC circuit 35, the first electrode 31 coupled to one end side of the LC circuit 35, and the second electrode 32 coupled to the other end side of the LC circuit 35, and the detection IC 51 (control circuit) configured to detect the input support device 3 based on the detection signals Vdet2 that are output from the detection electrodes Rx. The reference potential is supplied to the drive electrode Tx corresponding to one of the first electrode 31 and the second electrode 32, the second detection drive signal VD2 is supplied to the drive electrode Tx corresponding to the other of the first electrode 31 and the second electrode 32, the control circuit detects the positive-polarity regions PP formed by the positive-polarity signal values KSp of equal to or larger than a predetermined first threshold and the negative-polarity regions PM formed by the negative-polarity signal values KSm of equal to or smaller than a predetermined second threshold in the two-dimensional distribution of the signal values KSp and KSm based on the detection signals Vdet2.

First Modification

Figure 23:
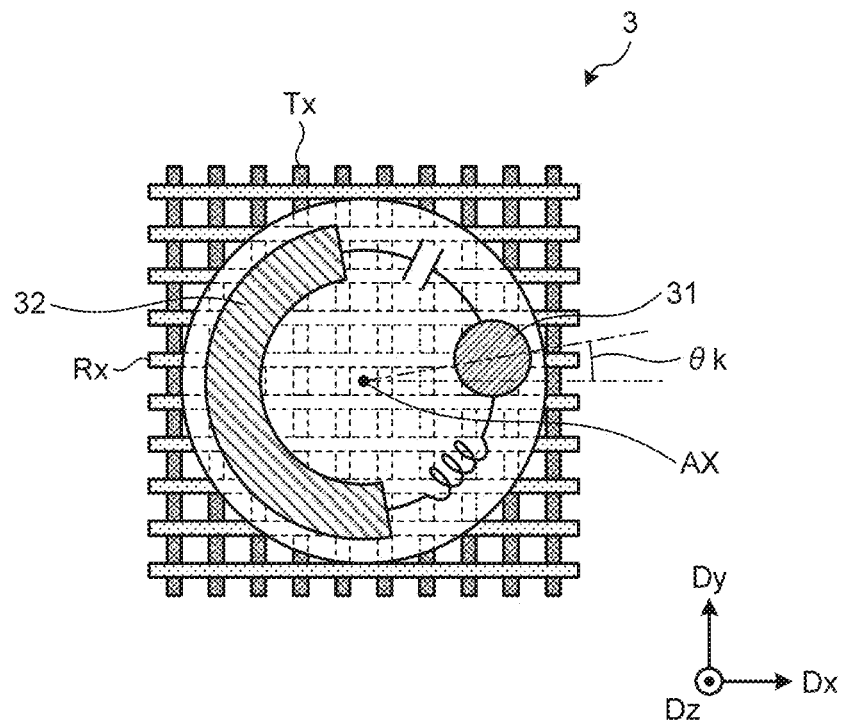
FIG. 23 is a plan view schematically illustrating an input support device, a plurality of drive electrodes, and a plurality of detection electrodes when a rotation angle of the input support device is 5° according to a first modification.
Figure 24:
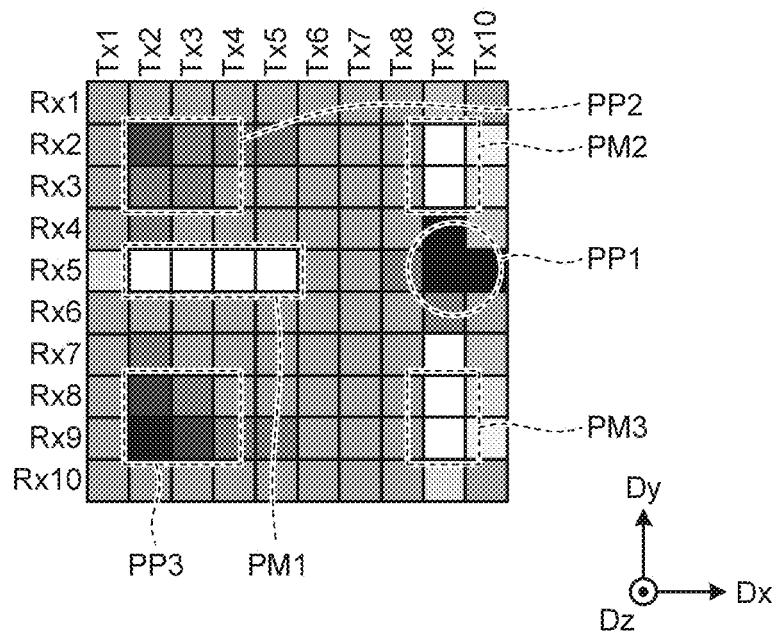
FIG. 24 is a descriptive view for explaining distribution of signal values when the rotation angle of the input support device is 5°.
Figure 25:
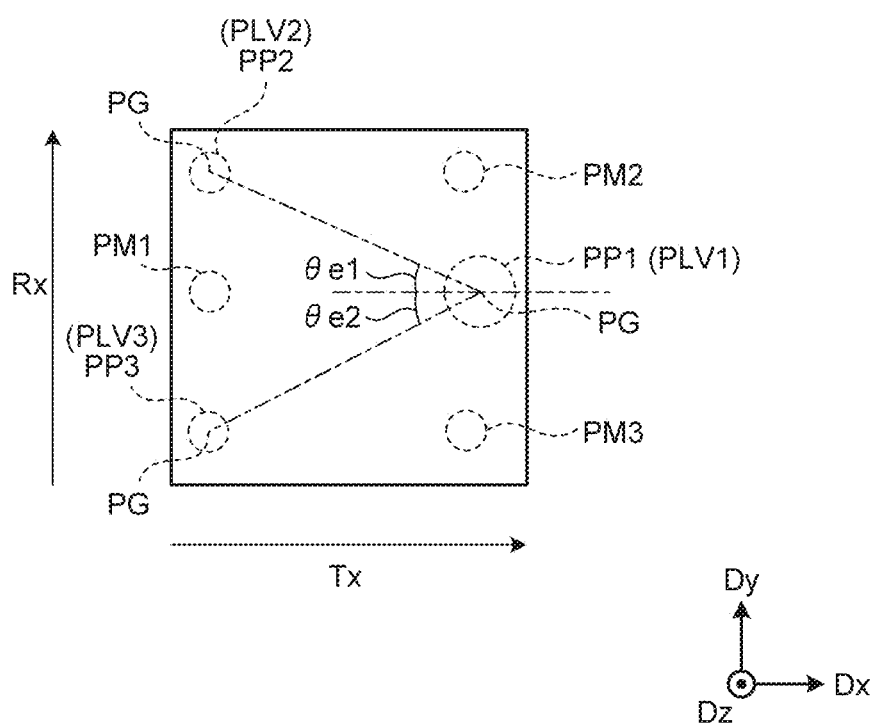
FIG. 25 is a descriptive view for explaining a method for detecting an electrode angle based on the peak regions when the rotation angle of the input support device is 5°.

FIG. 23 is a plan view schematically illustrating an input support device, a plurality of drive electrodes, and a plurality of detection electrodes when a rotation angle of the input support device is 5° according to a first modification. FIG. 24 is a descriptive view for explaining distribution of signal values when the rotation angle of the input support device is 5°. FIG. 25 is a descriptive view for explaining a method for detecting an electrode angle based on the peak regions when the rotation angle of the input support device is 5°. In the following explanation, the same reference numerals denote the same components described in the above-mentioned embodiment and repeated explanation thereof is omitted.

In the input detection system 1 according to the first modification, an example in which the electrode angle θe is calculated using three peaks at step ST24 (refer to FIG. 12) as described above will be described. In FIG. 23 to FIG. 25, a case in which the rotation angle θk of the input support device 3 is 5° will be described. The first modification can however be applied also to the case in which the rotation angle θk of the input support device 3 is other than 5° as in the case of FIG. 14, FIG. 16, and the like as described above.

As illustrated in FIG. 23, when the rotation angle θk of the input support device 3 is 5°, the first electrode 31 is arranged such that the center position thereof slightly deviates in the second direction Dy with respect to a virtual line passing through the rotating axis AX and extending in the first direction Dx.

As illustrated in FIG. 24, the first positive-polarity region PP1, the second positive-polarity region PP2, and the third positive-polarity region PP3 formed by the positive-polarity signal values KSp and the first negative-polarity region PM1, the second negative-polarity region PM2, and the third negative-polarity region PM3 formed by the negative-polarity signal values KSm are detected in distribution of the signal values KSp and KSm detected in the second detection period TP2.

An arrangement relation among the three positive-polarity regions PP and the three negative-polarity regions PM is similar to that in the above-mentioned first embodiment. That is to say, the positive-polarity regions PP and the negative-polarity regions PM having different polarities are arranged so as to be adjacent to each other in the first direction Dx or the second direction Dy. The positive-polarity regions PP having the same polarity are arranged so as to be adjacent to each other diagonally (in the oblique direction), and the negative-polarity regions PM having the same polarity are arranged so as to be adjacent to each other diagonally (in the oblique direction). The gravity center positions of the three positive-polarity regions PP and the three negative-polarity regions PM, and the respective peak signal values thereof are however different from those in the above-mentioned first embodiment (refer to FIG. 17).

As illustrated in FIG. 25, the detection IC 51 detects, as a first electrode angle θe1, an angle formed by a virtual line passing through the gravity center PG of the first positive-polarity region PP1 and parallel with the first direction Dx and a virtual line connecting the gravity center PG of the first positive-polarity region PP1 and the gravity center PG of the second positive-polarity region PP2 that are adjacent to each other. The detection IC 51 detects, as a second electrode angle θe2, an angle formed by a virtual line passing through the gravity center PG of the first positive-polarity region PP1 and parallel with the first direction Dx and a virtual line connecting the gravity center PG of the first positive-polarity region PP1 and the gravity center PG of the third positive-polarity region PP3 that are adjacent to each other.

The detection IC 51 calculates respective peak signal values PLV1, PLV2, and PLV3 of the first positive-polarity region PP1, the second positive-polarity region PP2, and the third positive-polarity region PP3 that are used for calculation of the electrode angle θe. The peak signal values PLV1, PLV2, and PLV3 are signal values KSp indicating maximum values among the positive-polarity signal values KSp forming the respective positive-polarity regions PP.

In the first modification, the detection IC 51 weights the first electrode angle θe1 and the second electrode angle θe2 using coefficients calculated with the peak signal values PLV1, PLV2, and PLV3 to thereby calculate the electrode angle θe. To be specific, the detection IC 51 calculates the electrode angle θe based on the following equation (2).

$$\theta e = (\theta e1 \times (PLV2/PLV3) + \theta e2 \times (PLV3/PLV2))/2 \qquad (2)$$

As described above, the detection IC 51 multiplies each of the first electrode angle θe1 and the second electrode angle θe2 calculated with the three peaks (the first positive-polarity region PP1, the second positive-polarity region PP2, and the third positive-polarity region PP3) by a ratio of the peak signal values PLV2 to PLV3 as a coefficient. The detection IC 51 can thereby calculate the electrode angle θe with high accuracy. That is to say, when a difference between the peak signal value PLV2 and the peak signal value PLV3 is small, an error between the electrode angle θe when the first positive-polarity region PP1 and the second positive-polarity region PP2 are selected as two peaks and the electrode angle θe when the first positive-polarity region PP1 and the third positive-polarity region PP3 are selected as two peaks can be reduced at step ST24 as described above.

In the first modification, when the rotation angle θk of the input support device 3 is calculated based on the electrode angle θe calculated using the equation (2), the detection IC 51 can use not the conversion table illustrated in FIG. 22 but a conversion table or an approximate expression corresponding to the method using the equation (2).

Second Modification

Figure 26:
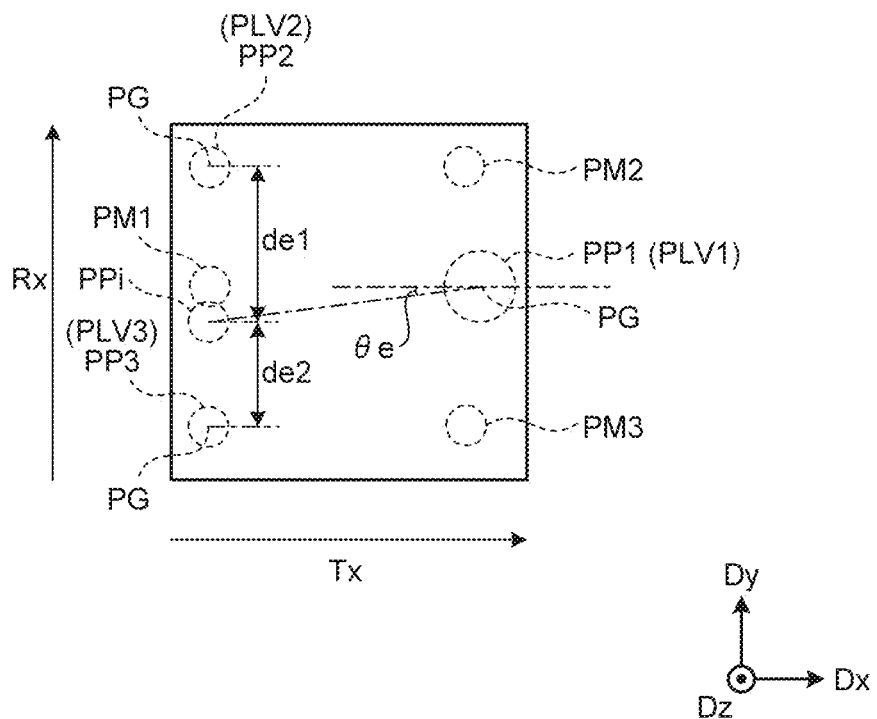
FIG. 26 is a descriptive view for explaining a method for detecting an electrode angle based on a plurality of peak regions when a rotation angle of an input support device is 5° according to a second modification.

FIG. 26 is a descriptive view for explaining a method for detecting an electrode angle based on a plurality of peak regions when a rotation angle of an input support device is 5° in a second modification. In the second modification, an example in which the electrode angle θe is calculated using three peaks at step ST24 (refer to FIG. 12) as described above will be described.

To be specific, as illustrated in FIG. 26, the detection IC 51 calculates an intermediate peak region PPi located between the second positive-polarity region PP2 and the third positive-polarity region PP3. The intermediate peak region PPi is a virtual peak region for calculating the electrode angle θe. The detection IC 51 calculates a position of the intermediate peak region PPi using positions of the gravity centers PG of the second positive-polarity region PP2 and the third positive-polarity region PP3 and the peak signal values PLV2 and PLV3. To be specific, the detection IC 51 calculates a position of the intermediate peak region PPi (intermediate positive-polarity region) between the second positive-polarity region PP2 and the third positive-polarity region PP3 based on a ratio of the peak signal value PLV2 of the second positive-polarity region PP2 to the peak signal value PLV3 of the third positive-polarity region PP3. For example, the detection IC 51 calculates the position of the intermediate peak region PPi based on the following equation (3).

$$PPi(x,y)=(PP2(x,y)\times(PLV2/PLV3)+PP3(x,y)\times(PLV3/PLV2))/2 \quad (3)$$

It should be noted that PPi(x,y), PP2($x$, $y$), and PP3($x$, $y$) are positions of the intermediate peak region PPi, the second positive-polarity region PP2, and the third positive-polarity region PP3 respectively on an xy coordinate system.

As illustrated in FIG. 26, the position of the intermediate peak region PPi is calculated in accordance with the ratio of the peak signal values PLV2 to PLV3. In the second direction Dy, a distance de1 between the second positive-polarity region PP2 and the intermediate peak region PPi is different from a distance de2 between the third positive-polarity region PP3 and the intermediate peak region PPi.

The detection IC 51 detects, as the electrode angle θe, an angle formed by a virtual line passing through the gravity center PG of the first positive-polarity region PP1 and parallel with the first direction Dx and a virtual line connecting the gravity center PG of the first positive-polarity region PP1 and the gravity center PG of the intermediate peak region PPi.

When the rotation angle θk of the input support device 3 is calculated based on the electrode angle θe calculated in the second modification, the detection IC 51 can use not the conversion table illustrated in FIG. 22 and the conversion table in the first modification but a conversion table or an approximate expression corresponding to the method using the equation (3).

Third Modification

Figure 27:
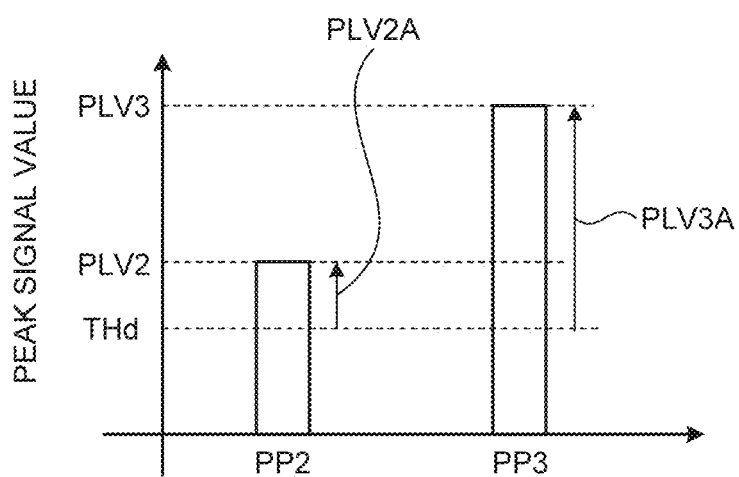
FIG. 27 is a descriptive view for explaining a method for calculating peak signal values of a plurality of peak regions according to a third modification.

FIG. 27 is a descriptive view for explaining a method for calculating peak signal values of a plurality of peak regions according to a third modification. FIG. 27 schematically illustrates the peak signal values PLV2 and PLV3 of the second positive-polarity region PP2 and the third positive-polarity region PP3 in a bar graph.

As illustrated in FIG. 27, the detection IC 51 compares the peak signal value PLV2 and the peak signal value PLV3 of the second positive-polarity region PP2 and the third positive-polarity region PP3 with a threshold THd. When one (for example, the peak signal value PLV2) of the peak signal value PLV2 and the peak signal value PLV3 is equal to or larger than the threshold THd and the other (for example, the peak signal value PLV3) of the peak signal values PLV2 and PLV3 is smaller than the threshold THd, the detection IC 51 selects the second positive-polarity region PP2 having the signal value of equal to or larger than the threshold THd as a peak having the second largest value at step ST24 (refer to FIG. 12) as described above. In this case, the third positive-polarity region PP3 is not used for the calculation of the electrode angle θe, and the detection IC 51 calculates the electrode angle θe with two peaks of the first positive-polarity region PP1 and the second positive-polarity region PP2.

When both of the peak signal values PLV2 and PLV3 are equal to or larger than the threshold THd, the detection IC 51 calculates the electrode angle θe by any of the methods in the first modification and the second modification as described above.

When difference between the peak signal value PLV2 and the peak signal value PLV3 is small, difference between the coefficient (PLV2/PLV3) and the coefficient (PLV3/PLV2) used in the above-mentioned equation (2) or equation (3) is small. In the third modification, the detection IC 51 calculates difference between the peak signal value PLV2 and the threshold THd, and difference between the peak signal value PLV3 and the threshold THd. A correction signal value PLV2A provided by the differences is PLV2A=PLV2−THd. A correction signal value PLV3A is PLV3A=PLV3−THd.

The detection IC 51 calculates a new coefficient (PLV2A/PLV3A) and a new coefficient (PLV3A/PLV2A) using the correction signal value PLV2A and the correction signal value PLV3A. The detection IC 51 substitutes the coefficient (PLV2A/PLV3A) and the coefficient (PLV3A/PLV2A) in place of the coefficient (PLV2/PLV3) and the coefficient (PLV3/PLV2) in the equation (2) or the equation (3). In the third modification, difference between the coefficients of the peak signal values PLV2 and PLV3 can thus be increased, thereby reliably performing correction (weighting) in accordance with the peak signal values PLV2 and PLV3 in the equation (2) or the equation (3).

Fourth Modification

Figure 28:
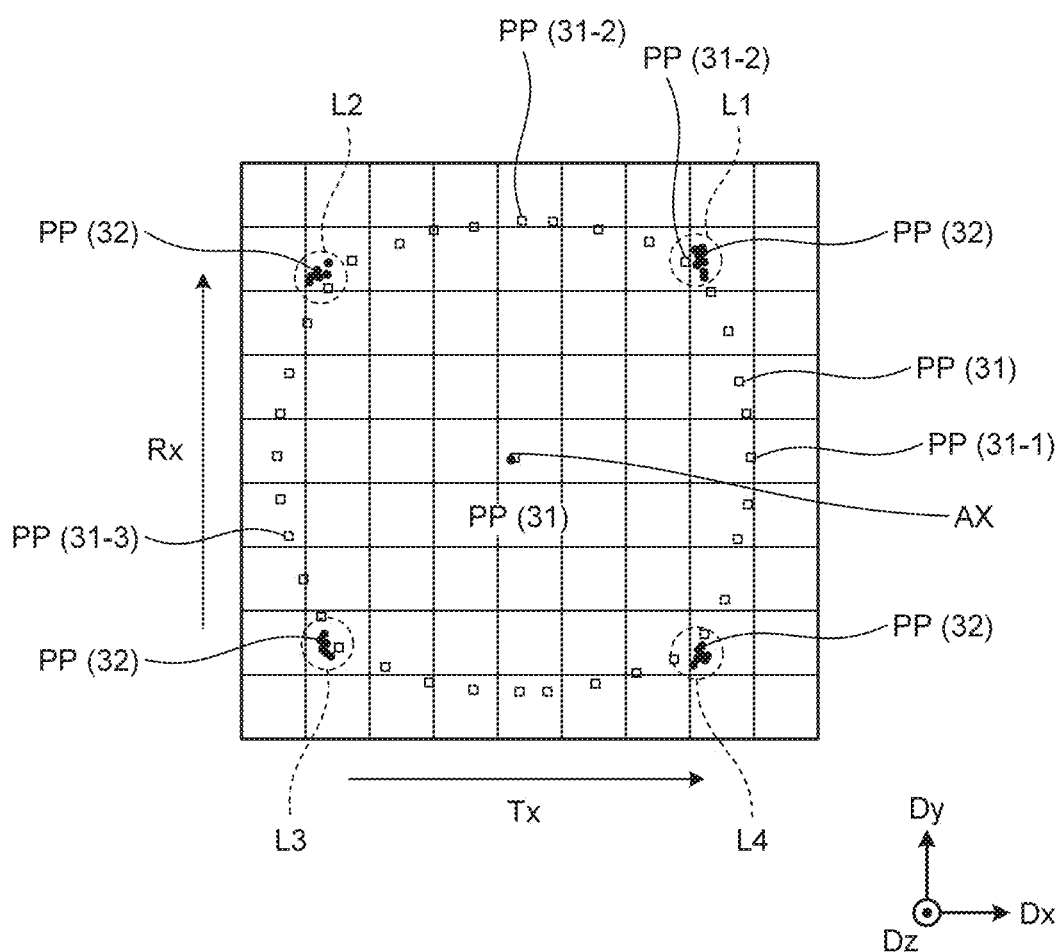
FIG. 28 is a descriptive view for explaining a locus of a plurality of positive-polarity regions corresponding to a first electrode of an input support device and a locus of a plurality of positive-polarity regions corresponding to a second electrode thereof according to a fourth modification.

FIG. 28 is a descriptive view for explaining a locus of a plurality of positive-polarity regions corresponding to a first electrode of an input support device and a locus of a plurality of positive-polarity regions corresponding to a second electrode thereof according to a fourth modification. FIG. 28 illustrates the loci of the positive-polarity regions detected when the input support device 3 is rotated 360° around the rotating axis AX.

As illustrated in FIG. 28, positive-polarity regions PP(31) corresponding to the first electrode 31 show a substantially circular locus around the rotating axis AX. On the other hand, positive-polarity regions PP(32) that are generated based on a relation with the second electrode 32 appear while being biased in four regions L1, L2, L3, and L4. The four regions L1, L2, L3, and L4 are regions located on a circumference around the rotating axis AX and intersecting with virtual lines passing through the rotating axis AX and inclined by about 45° with respect to the first direction Dx and the second direction Dy.

Figure 29:
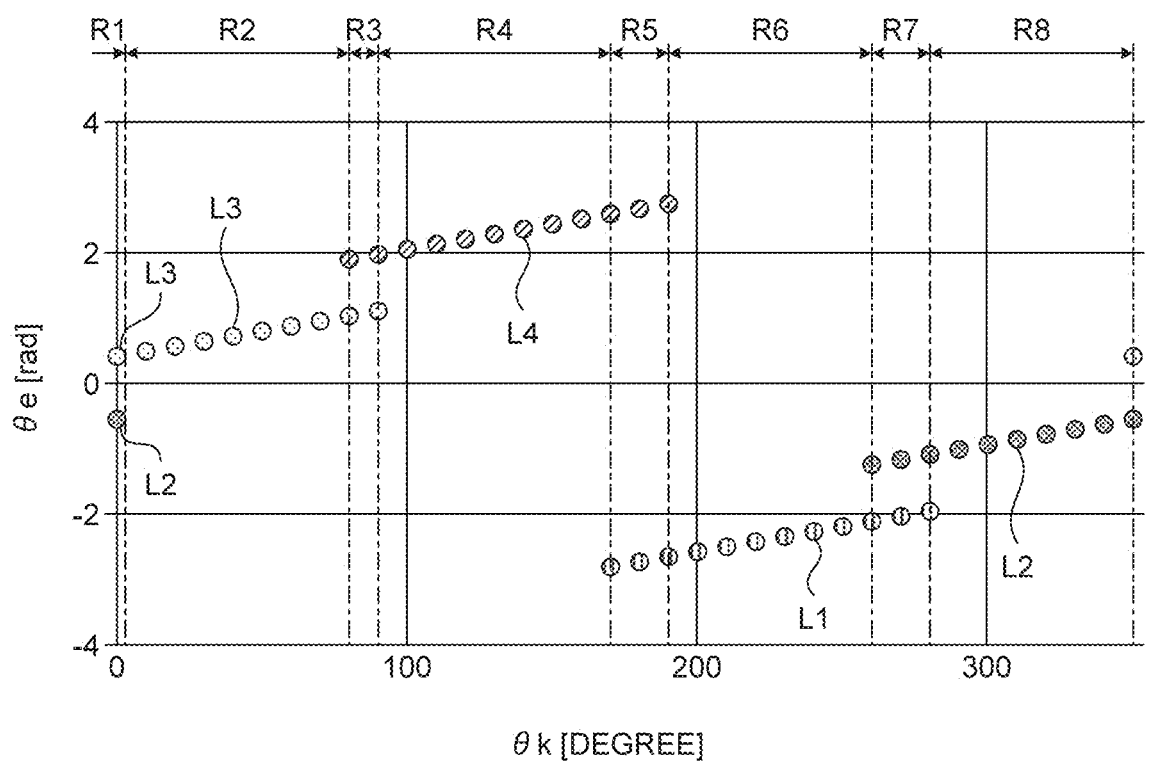
FIG. 29 is a graph illustrating an example of a conversion table indicating a relation between a rotation angle of the input support device and an electrode angle according to the fourth modification.

FIG. 29 is a graph illustrating an example of a conversion table indicating a relation between a rotation angle of the input support device and an electrode angle according to the fourth modification. In FIG. 29, a transverse axis indicates the rotation angle θk of the input support device 3 and a longitudinal axis indicates the electrode angle θe. As illustrated in FIG. 29, the regions L1, L2, L3, and L4 in which the positive-polarity regions PP(32) corresponding to the second electrode 32 are detected are different depending on the rotation angle θk of the input support device 3.

As illustrated in FIG. 28 and FIG. 29, two positive-polarity regions PP(32) including the regions L2 and L3 are detected in a rotation region R1 in which the rotation angle θk is around θk=0° (when the first electrode 31 is at a position corresponding to positive-polarity regions PP(31-1)).

Two positive-polarity regions PP(32) including the regions L3 and L4 are detected in a rotation region R3 in which the rotation angle θk is around θk=90° (when the first electrode 31 is at a position corresponding to positive-polarity regions PP(31-2)).

Similarly, two positive-polarity regions PP(32) including the regions L1 and L4 are detected in a rotation region R5 in which the rotation angle θk is around θk=180°. Two positive-polarity regions PP(32) including the regions L1 and L2 are detected in a rotation region R7 in which the rotation angle θk is around θk=270°.

One positive-polarity region PP(32) of the region L3 is detected in a rotation region R2 illustrated in FIG. 29. One positive-polarity region PP(32) of the region L4 is detected in a rotation region R4. One positive-polarity region PP(32) of the region L1 is detected in a rotation region R6. One positive-polarity region PP(32) of the region L2 is detected in a rotation region R8. One positive-polarity region PP(32) of the region L1 is detected in a rotation region R6 in which the rotation angle θk is around θk=200° (that is, when the first electrode 31 is at a position corresponding to positive-polarity regions PP(31-3) in FIG. 28), for example. The negative-polarity regions PM are present between the positive-polarity regions PP. Accordingly, when the positive-polarity and negative-polarity peaks are observed while including the first electrode 31 and the second electrode 32 of the input support device 3, six peaks (three positive-polarity regions PP and three negative-polarity regions PM) are generated in the rotation regions R1, R3, R5, and R7 and four peaks (two positive-polarity regions PP and two negative-polarity regions PM) are generated in the rotation regions R2, R4, R6, and R8.

The detection IC 51 can calculate the rotation angle θk using the conversion table illustrated in FIG. 29 at step ST26 (refer to FIG. 12) as described above. As described in the fourth modification, in the rotation regions R1, R3, R5, and R7, the rotation angle θk may be calculated based on the electrode angle θe calculated with one of the two positive-polarity regions PP(32), or the rotation angle θk may be calculated based on the two electrode angles θe calculated in the two respective positive-polarity regions PP(32) equivalently to the example illustrated in FIG. 25.

Fifth Modification

Figure 30:
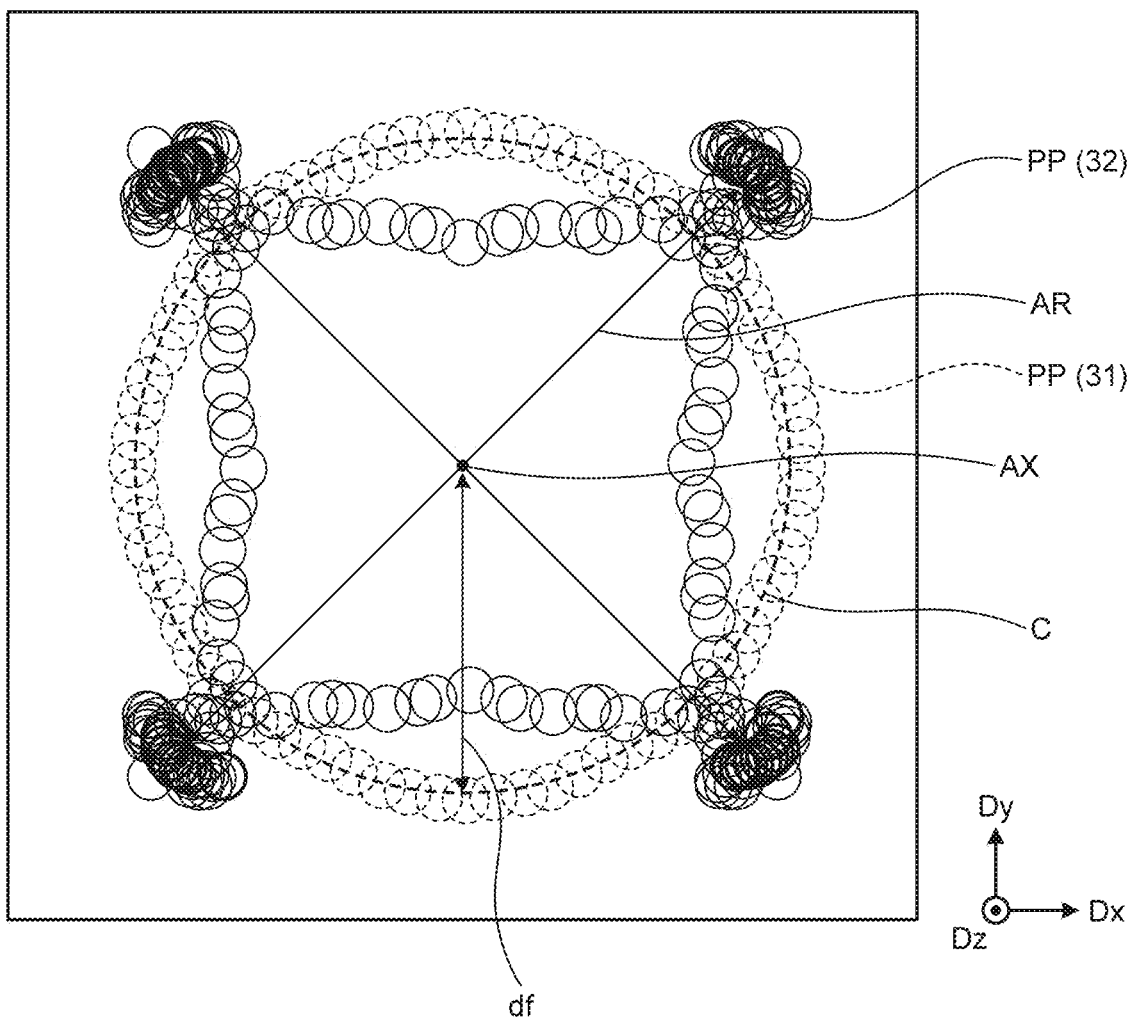
FIG. 30 is a descriptive view for explaining a method for detecting a center position of an input support device according to a fifth modification.
Figure 31:
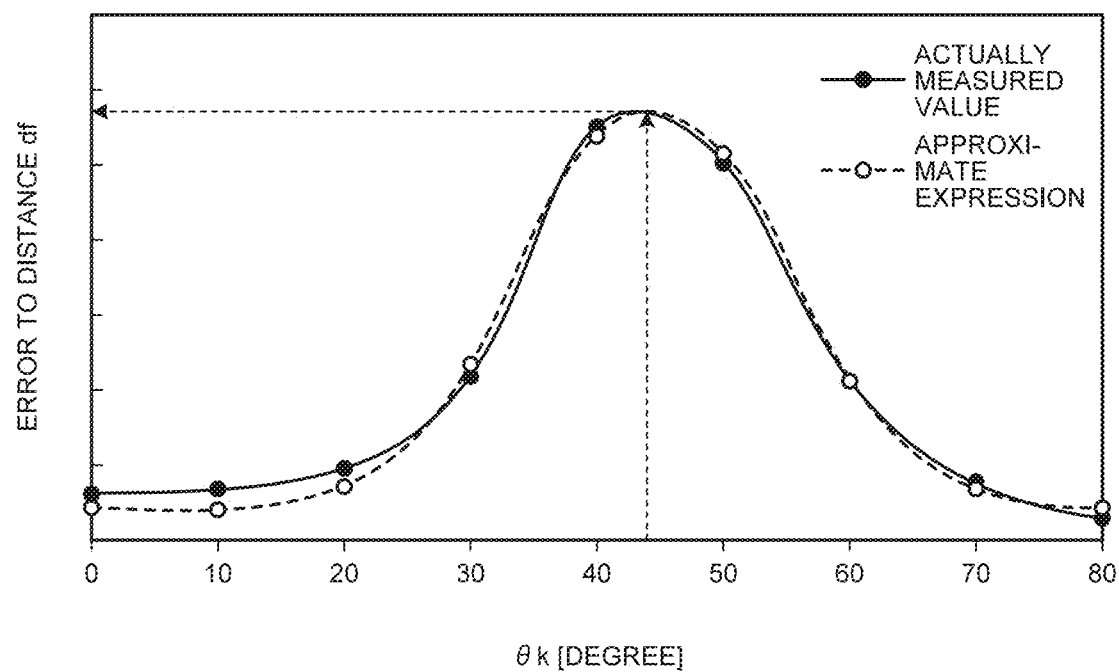
FIG. 31 is a graph illustrating an example of a correction table between a rotation angle of the input support device and an error of the input support device to a radius.

FIG. 30 is a descriptive view for explaining a method for detecting a center position of the input support device according to a fifth modification. FIG. 31 is a graph illustrating an example of a correction table between a rotation angle of the input support device and an error of a distance between the center of the input support device and a first electrode.

FIG. 30 is a descriptive view illustrating details of a locus of the positive-polarity regions PP(31) corresponding to the first electrode 31 and a locus of the positive-polarity regions PP(32) corresponding to the second electrode 32 detected when the input support device 3 is rotated by 360° about the rotating axis AX. A circle C indicated by dotted line is a reference circle having a constant radius around the rotating axis AX. The radius of the circle C is equal to a distance df between the gravity center of the first electrode 31 and the rotating axis AX.

As illustrated in FIG. 30, the positive-polarity regions PP(31) are detected on the outer side of the circle C in the oblique direction indicated by an arrow AR, to be more specific, with a cycle of (¼)×n±(½)×nπ (n is an integer). That is to say, distances between the detected positive-polarity regions PP(31) and the rotating axis AX may have errors with respect to the distance df of the actual input support device 3.

In FIG. 31, a transverse axis indicates the rotation angle θk of the input support device 3 and a longitudinal axis indicates the error of the detected positive-polarity regions PP (31) to the distance df. The detection IC 51 previously stores an approximate expression of the error to the distance df that is provided from actually measured values of the locus of the positive-polarity regions PP(31). The detection IC 51 can correct the position of the rotating axis AX (center of the input support device 3) using the correction table illustrated in FIG. 31 at step ST27 (refer to FIG. 12) as described above. The position of the input support device 3 can thereby be detected with high accuracy in the fifth modification.

Although the preferred embodiments of the present disclosure have been described above, the present disclosure is not limited by these embodiments. Contents disclosed in the embodiments are merely examples, and various modifications can be made in a scope without departing from the gist of the present disclosure. Appropriate modifications in a scope without departing from the gist of the present disclosure naturally belong to the technical scope of the present disclosure. At least one of various omission, replacement, and modification of the components can be performed in a scope without departing from the gist of the embodiments and modifications described above.

What is claimed is:

1. An input detection system comprising:
   a plurality of drive electrodes and a plurality of detection electrodes aligned in a detection region;
   an input device including an LC circuit, a first electrode coupled to one end side of the LC circuit, and a second electrode coupled to another end side of the LC circuit, the input device being disposed on the detection region; and
   a control circuit configured to detect the input device based on detection signals that are output from the detection electrodes, wherein
   each of the first electrode and the second electrode of the input device faces some of the drive electrodes and detection electrodes,
   a reference potential is supplied to a drive electrode corresponding to one of the first electrode and the second electrode,
   a drive signal is supplied to a drive electrode corresponding to the other of the first electrode and the second electrode,
   each of the first electrode and the second electrode forms capacitance with a facing detection electrode based on the reference potential or the drive signal,
   the detection electrodes form capacitances with the first electrode and the second electrode of the input device and an adjacent drive electrode and output the detection signals that are generated based on the capacitances to the control circuit, and
   the control circuit forms two-dimensional distribution of a plurality of signal values corresponding to the detection region based on the detection signals that are output from the detection electrodes and detects, from the two-dimensional distribution, a plurality of positive-polarity regions formed by a plurality of positive-polarity signal values of equal to or larger than a predetermined first threshold and a plurality of negative-polarity regions formed by a plurality of negative-polarity signal values of equal to or smaller than a predetermined second threshold.

2. The input detection system according to claim 1, wherein the control circuit detects a position of the input device in the detection region and an orientation of the input device based on the positive-polarity regions and the negative-polarity regions in the two-dimensional distribution.

3. The input detection system according to claim 1, wherein the control circuit calculates, as an electrode angle, an angle formed by a virtual line connecting two positive-polarity regions adjacent to each other among the positive-polarity regions and a first direction as a direction in which the drive electrodes are aligned.

4. The input detection system according to claim 1, wherein
the control circuit detects a first positive-polarity region, a second positive-polarity region, and a third positive-polarity region from the two-dimensional distribution and calculates a first electrode angle formed by a virtual line connecting the first positive-polarity region and the second positive-polarity region adjacent to each other and a first direction as a direction in which the drive electrodes are aligned, and
the control circuit calculates a second electrode angle formed by a virtual line connecting the first positive-polarity region and the third positive-polarity region adjacent to each other and the first direction.

5. The input detection system according to claim 4, wherein
the control circuit further multiplies each of the first electrode angle and the second electrode angle by a ratio of a maximum signal value of the second positive-polarity region to a maximum signal value of the third positive-polarity region as a coefficient, thereby correcting the first electrode angle and the second electrode angle, and
the control circuit further calculates a final electrode angle using the corrected first electrode angle and the corrected second electrode angle.

6. The input detection system according to claim 1, wherein
the control circuit detects a first positive-polarity region, a second positive-polarity region, and a third positive-polarity region from the two-dimensional distribution and calculates a position of an intermediate positive-polarity region between the second positive-polarity region and the third positive-polarity region based on a ratio of a maximum signal value of the second positive-polarity region to a maximum signal value of the third positive-polarity region, and
the control circuit calculates, as an electrode angle, an angle formed by a virtual line connecting two of the first positive-polarity region and the intermediate positive-polarity region adjacent to each other and a first direction as a direction in which the drive electrodes are aligned.

7. The input detection system according to claim 4, wherein the first positive-polarity region includes a maximum signal value in the two-dimensional distribution of the signal values in detection of the electrode angle.

8. The input detection system according to claim 3, wherein
the input device holds the first electrode and the second electrode in a rotatable manner around a rotating axis, and
the control circuit applies the calculated electrode angle to a conversion table indicating a relation between the electrode angle and rotation angles of the first electrode and the second electrode to calculate a rotation angle of the input device.

9. The input detection system according to claim 8, wherein the first electrode faces the second electrode with respect to the rotating axis.

10. The input detection system according to claim 4, wherein
the input device holds the first electrode and the second electrode in a rotatable manner around a rotating axis, and
the control circuit applies the calculated electrode angle to a conversion table indicating a relation between the electrode angle and rotation angles of the first electrode and the second electrode to calculate a rotation angle of the input device.

11. The input detection system according to claim 10, wherein the first electrode faces the second electrode with respect to the rotating axis.

12. The input detection system according to claim 6, wherein
the input device holds the first electrode and the second electrode in a rotatable manner around a rotating axis, and
the control circuit applies the calculated electrode angle to a conversion table indicating a relation between the electrode angle and rotation angles of the first electrode and the second electrode to calculate a rotation angle of the input device.

13. The input detection system according to claim 12, wherein the first electrode faces the second electrode with respect to the rotating axis.

14. The input detection system according to claim 1, wherein an area of the first electrode is different from an area of the second electrode in a plan view.

15. The input detection system according to claim 14, wherein the area of the second electrode is larger than the area of the first electrode.

16. The input detection system according to claim 15, wherein the first electrode overlaps with at least equal to or more than one drive electrode, and the second electrode overlaps with at least equal to or more than two drive electrodes.

17. The input detection system according to claim 15, wherein the first electrode overlaps with at least equal to or more than one detection electrode, and the second electrode overlaps with at least equal to or more than two detection electrodes.

* * * * *